United States Patent [19]

Kimura

[11] Patent Number: 5,022,209
[45] Date of Patent: Jun. 11, 1991

[54] METHOD FOR CONSTRUCTION OF BUILDING AND JOINT APPARATUS FOR CONSTRUCTION MEMBERS

[75] Inventor: Kazuyoshi Kimura, Sagae, Japan

[73] Assignee: Shelter Home Co. Ltd., Yamagata, Japan

[21] Appl. No.: 139,796

[22] Filed: Dec. 29, 1987

[30] Foreign Application Priority Data

Mar. 20, 1987 [JP] Japan ................. 62-064382
Mar. 20, 1987 [JP] Japan ................. 62-064391

[51] Int. Cl.$^5$ ................................ E04B 1/26
[52] U.S. Cl. ........................ 52/646; 52/90; 52/93; 52/263; 52/665; 52/729; 403/173
[58] Field of Search ............... 403/170, 173, 172, 174; 52/281, 648, 234, 712, 715, 726, 73, 296, 93, 90, 236.3, 301, 637, 638, 639, 640, 641, 728; 182/178

[56] References Cited

U.S. PATENT DOCUMENTS

| | | | |
|---|---|---|---|
| 725,527 | 4/1903 | Whitehurst | 403/173 |
| 949,394 | 2/1910 | Daley | 403/173 |
| 1,258,408 | 3/1918 | Hill | 52/90 |
| 1,258,409 | 3/1918 | Hill . | |
| 2,053,462 | 9/1936 | Chaplin | 52/648 |
| 2,070,937 | 2/1937 | Vallet | 52/263 |
| 2,114,901 | 4/1938 | Henderson | 52/729 |
| 2,723,107 | 11/1955 | Parker | 52/648 |
| 2,871,997 | 2/1959 | Simpson | 52/93 |
| 3,456,405 | 7/1969 | Hida | 52/665 |
| 3,513,610 | 5/1970 | Devonport | 52/648 |
| 3,641,723 | 2/1972 | Delcroix | 52/281 |
| 4,032,291 | 6/1977 | Martin | 403/217 |
| 4,068,436 | 1/1978 | Sato | 52/301 |
| 4,432,590 | 2/1984 | Lawrence | 52/281 |

FOREIGN PATENT DOCUMENTS

| | | | |
|---|---|---|---|
| 218715 | 5/1961 | Austria | 403/173 |
| 2207075 | 3/1973 | Fed. Rep. of Germany | 52/236.3 |
| 2919765 | 11/1980 | Fed. Rep. of Germany | 52/648 |
| 1371087 | 7/1964 | France | 52/648 |
| 2226516 | 11/1974 | France | 52/236.3 |
| 51-107626 | 3/1975 | Japan . | |
| 5347605 | 3/1975 | Japan . | |
| 627233 | 5/1978 | U.S.S.R. | 52/296 |
| 614185 | 7/1978 | U.S.S.R. | 403/217 |

Primary Examiner—John E. Murtagh
Attorney, Agent, or Firm—Sandler, Greenblum & Bernstein

[57] ABSTRACT

A basic joint member and a plurality of application joint members are formed so that a side plate portion or end plate portion is fitted to the end face of a construction member constituting a post, a beam or the like and a coupling plate portion extending from the side plate portion or end plate portion orthogonally to the side plate portion or end plate portion is fitted in a groove formed in the end face of the construction member or is gripped between construction members including two parallel members, and the connecting plate portion is clamped by a clamping member. The basic member containing a longitudinal construction member is combined with and connected to at least one application joint member for a lateral construction member, a lateral construction member orthogonal to the first-mentioned lateral construction member and an oblique construction member to construct a joint apparatus for construction members. Furthermore, a construction method using this joint apparatus and a building constructed according to this construction method are provided.

38 Claims, 18 Drawing Sheets

FIG.10(a)
FIG.10(b)
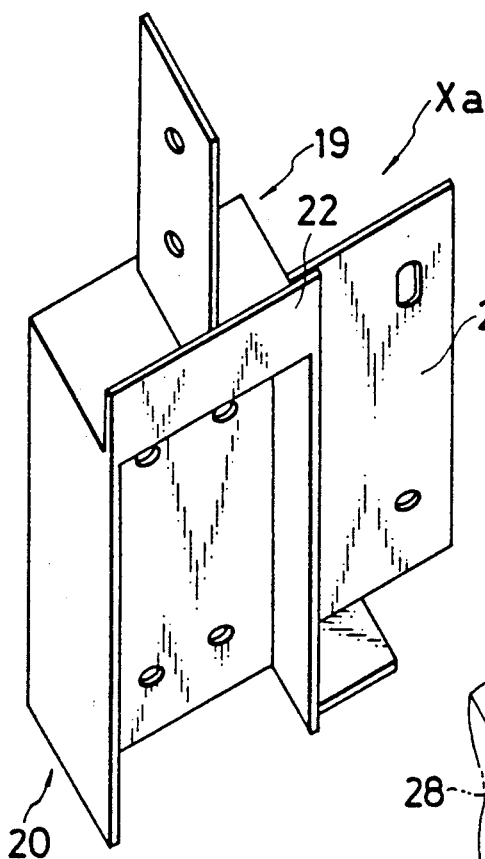
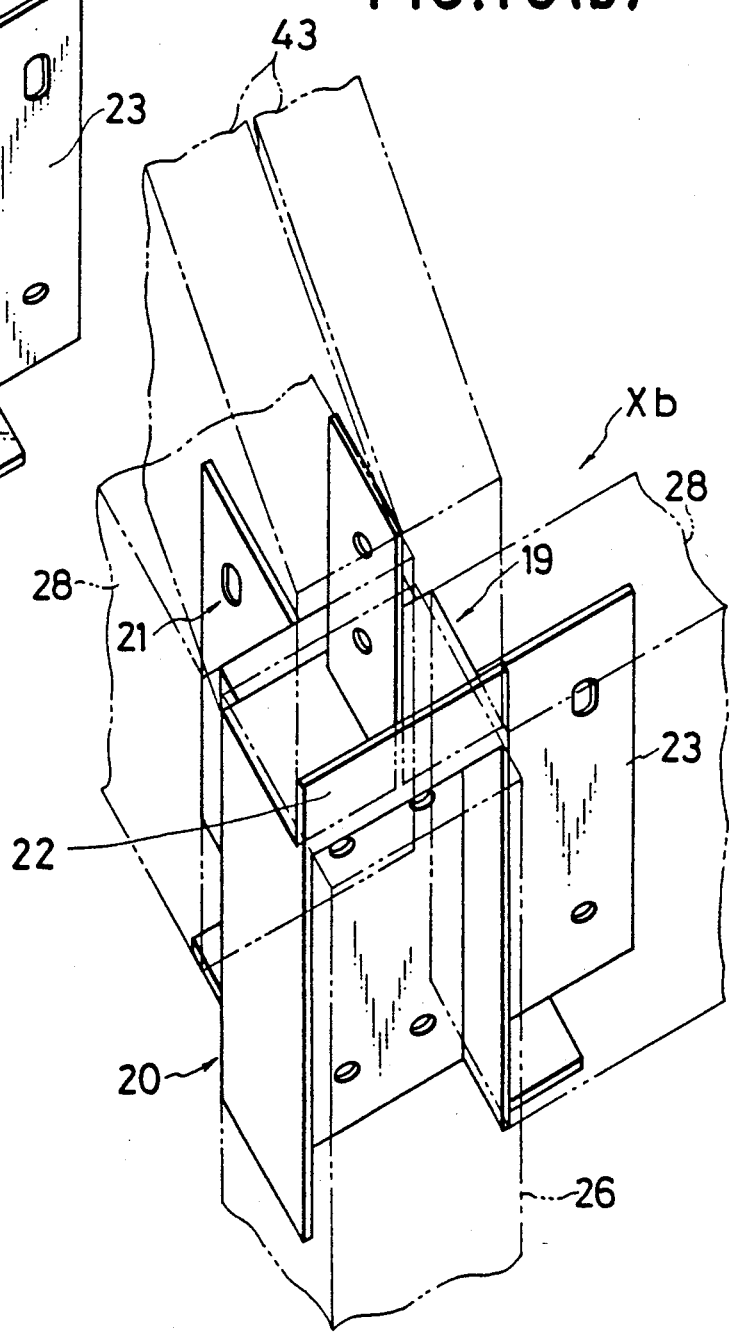

METHOD FOR CONSTRUCTION OF BUILDING AND JOINT APPARATUS FOR CONSTRUCTION MEMBERS

BACKGROUND OF THE INVENTION

1. Field of the Invention

The present invention relates to a novel joint apparatus for construction members in use for a simple building of a wooden house or a concrete steel building, a building fabricated by using this apparatus and a construction method using this apparatus. More particularly, the present invention relates to a joint apparatus comprising a joint member formed of a metal or the like, which makes it possible to assemble mass-produced construction members of a certain standard very easily at a construction field, construction which makes it possible to easily fabricate a simple building by using this joint apparatus and standardized construction members, and a method for construction of this simple building.

2. Description of the Prior Art

As the conventional method for construction of a building, there are known a frame work method and a built-up wall method.

The former method is called "skeleton skin method" or "post & beam work method" and is a construction method using posts and beams as main members.

The latter method is called "two-by-four work method" or "platform frame work method" and according to this method, a building is constructed by attaching a wall member, which is formed by clamping a construction plywood or the like to a wall frame assembled by frame members, to a floor formed by clamping a construction plywood or a surface member having a performance comparable or superior to that of a construction plywood to a floor frame assembled by sleepers.

The differences between these methods will now be described while comparing them with each other. In the first place, the space is constructed by "axes (lines)" in the former method and by "plates (faces)" in the latter method, and the structure for imparting a rigidity to a floor surface, a wall surface and the like consists of "angle braces and diagonal braces" in the former method and "construction plywoods" in the latter method. Used timbers are "long timbers having a large section, mainly a square section (through posts)" in the former method and "short timbers having mainly a small section" in the latter method. The working process comprises "continuous fabrication of first floor and second floor axes, platforms and small chambers" in the former method and "first floor platform →first floor wall→second floor platform→second floor wall→small chambers (stepwise operation)" in the latter method.

However, these conventional construction methods involve problems as described below.

Namely, in the conventional frame work method, the space is mainly constructed by axes and through posts are used. Accordingly, the operation requires much labor and the material cost is increased. Furthermore, since the structure imparting a rigidity to floor faces and wall faces is constructed by angle braces and diagonal braces, the structure becomes complicated and the operation requires time and labor. Especially, since a core wall structure is formed, a foundation should be made and the operation requires much more time and labor.

In the built-up wall method, the space is mainly constructed by faces, and angle braces or diagonal braces need not be used. However, this method is inferior to the frame work method in strength. Furthermore, the operation of assembling wall frames on a floor (operation platform) and raising up the assembled wall frames is necessary and this operation requires much time and labor.

In the operation of constructing a building such as a wooden house, after formation of a foundation, construction members such as timbers are skillfully cut and notched and they are skillfully assembled and coupled according to structure dynamics, and main coupling portions of the construction members are secured by bolts or the like. In the conventional methods, however, a high degree of technique and skill are required for coupling the construction members, the operation efficiency is low, economical utilization of construction members is not attained, the strength of the coupled portion is poor and the construction term is long. As a result, construction costs are increased.

In recently developed, so-called prefabricated buildings, the above-mentioned economical problems are tentatively solved by mass production, but the durability and strength (especially the strength of the coupled portion) are poor and the diversity is insufficient. Furthermore, a prefabricated building becomes wretched with the lapse of time after construction and even if the prefabricated building is used for many years, calmness or massiveness is not imparted to the building.

Under this background, research was performed on coupling of construction members as described above, and, as the result, a joint for construction members, has been developed which is much simpler than the combination of an iron plate and bolts and nuts, that is, the simplest coupling means heretofore adopted, and is superior in the strength to the utilization of wood cutting and notching means.

This joint is disclosed in Japanese Patent Application Laid-Open Specification No. 107626/76.

This joint comprises a basic joint proper having a cubic or trapezoidal shape and a plate member extending outwardly from the surface of the basic joint proper in a plane substantially orthogonal to said surface, which is welded and secured to the basic joint proper, and a hole is formed through the plate member so that a fixing member such as a bolt can pass through this hole. According to this proposal, a variety of joint members can be obtained by combining the basic joint proper and the plate member while changing the shapes, numbers and directions thereof.

However, since the basic joint proper having a cubic or trapezoidal shape is necessary for this conventional joint, there is involved the problem that the weight of the joint is considerably increased, the amount of the material is increased, and consequently the joint is disadvantageous from the economical viewpoint.

Furthermore, since a joint in which all the plate members are secured to the basic joint proper is prepared in advance and used in the construction field, the joint having a considerable weight should be handled and the handling is difficult, and the efficiency of the operation of coupling construction members by using this joint is very low and the construction term is prolonged.

When this conventional joint is used, there is adopted a method in which a certain construction member is connected to this joint and other construction members are attached to the joint in sequence. In this method, since other construction members are connected to the joint to which a certain construction member has already been connected and secured, the said other construction members should be precisely registered, and hence, the coupling operation is difficult and the operation efficiency is lowered.

Still further, when a building is enlarged or altered, coupling of construction members such as timbers cannot be changed without changing the used joint, and enlargement or remodeling of the building cannot be freely performed.

SUMMARY OF THE INVENTION

Under this background, it is a primary object of the present invention to provide a building and a method for construction of the building, in which the characteristics of both the conventional frame work method and the built-up wall method are mixed together, the coupling positions of construction members are simplified and standardized to facilitate assembly, and construction can be performed even by an unskilled worker.

Another object of the present invention is to provide a uniform, cheap, high-quality building having a drastically increased construction strength and making it possible to shorten the construction term and a method for construction of this building.

Still another object of the present invention is to provide a novel joint apparatus suitable for coupling construction members used for the above-mentioned building and construction method, which comprises a plurality of kinds of standardized joint members which are appropriately arranged.

According to the building and construction method of the present invention, a standardized precut member can be used as the construction member, and such precut members are coupled by standardized joint members to form a frame work of a building, and a complicated connection or joint need not be used for coupling of precut members such as post members and beam members and by using standardized joint members, a building is constructed from the lower portion by coupling of precut members in sequence as in case of the multi-storied building construction method. Furthermore, use of precut members makes it unnecessary to process construction members inclusive of those of the upper ridge.

According to the building and construction method of the present invention, when each story of a building having a plurality of stories is formed at construction of this building, a floor structure is formed by clamping a face member to a floor frame assembled by beam members, and bracing of the floor, conducted in the conventional method, becomes unnecessary. Moreover, the floor portion, that is, a platform, is first formed and this platform can be used as a workshop.

Still further, according to the building and construction method of the present invention, a post member is erected on the floor structure and a beam member is combined with this post member to form a floor frame work, whereby use of a through post is omitted, the weight of the post member is reduced and use of a crane or the like is omitted. A roof portion of each story is first constructed by the floor structure of the upper story and risk of leakage of rainwater on construction members under construction is avoided.

Still further, a wall is constructed by fitting a frame work formed of frame members into a frame portion formed of the above-mentioned post member and beam member and clamping a construction plywood or the like to the frame portion, and, by thus forming a force-resistant wall by the construction plywood or the like, bracing of the wall is made unnecessary. Since the construction per se acts as the foundation of the wall, it is not necessary to make a foundation and a dry working method can be adopted, with the result that the working term is shortened.

In accordance with the fundamental aspect of the present invention for attaining the foregoing objects, there is provided a joint apparatus for construction members, which is used in combination with clamping means (a) and comprises a basic joint member (b) combined with at least one member selected from a first application joint member (c) and a second application joint member (d), wherein the basic joint member (b) comprises a pair of first and second side plate portions, which may be substantially solid, extending in the longitudinal direction and confronting each other with a predetermined space therebetween, a longitudinal intermediate plate portion having both the ends fixed to the central parts of the confronting inner faces of the side plate portions to connect both the side plate portions and having first holes for insertion of said clamping means and a lateral end plate portion having one end of the periphery secured to said side plate portions and intermediate plate portion, said basic joint member having an H-figured lateral sectional shape defining a space in which the end portion of at least one first longitudinal construction member, the first application joint member (c) comprises a first coupling plate portion having second holes for insertion of said clamping means, said first coupling plate portion having one side end fixed to the central part of the outer face of at least one of said side plate portions of the basic joint member, extending in the same plane as the intermediate portion and being arranged to couple a first lateral construction member is fitted, and the second application joint member (d) comprises a third side plate portion secured and attached to at least one side face substantially parallel to said intermediate plate portion in the end portion of the first longitudinal construction member fitted in the basic joint member and having third holes for insertion of the clamping means and a second coupling plate for coupling a second lateral construction member, said second coupling plate portion having one side end secured to the central part of the third side plate portion, extending substantially in parallel to the first and second side plate portions, extending orthogonally to the first lateral construction member and having fourth holes for insertion of said clamping means.

In accordance with another aspect of the present invention, there is provided a joint apparatus for construction members, which comprises said basic joint member (b) combined with at least one member selected from said first application joint member(c), said second application joint member (d) and a third application joint member (e) comprising a third coupling plate portion for fixation and attachment of an oblique construction member, which extends form the central part of the end plate portion of the basic joint member in a square plane in said end plate portion.

According to the method for construction of a building by using the above-mentioned joint apparatus of the present invention for construction members, the joint apparatus is coupled with longitudinal, lateral and/or oblique construction members by clamping means.

A building according to the present invention is a construction fabricated by this coupling method.

The structure and features of the present invention will now be described in detail with reference to the embodiments in the accompanying drawings.

DETAILED DESCRIPTION OF THE PREFERRED EMBODIMENTS

Figure 1:
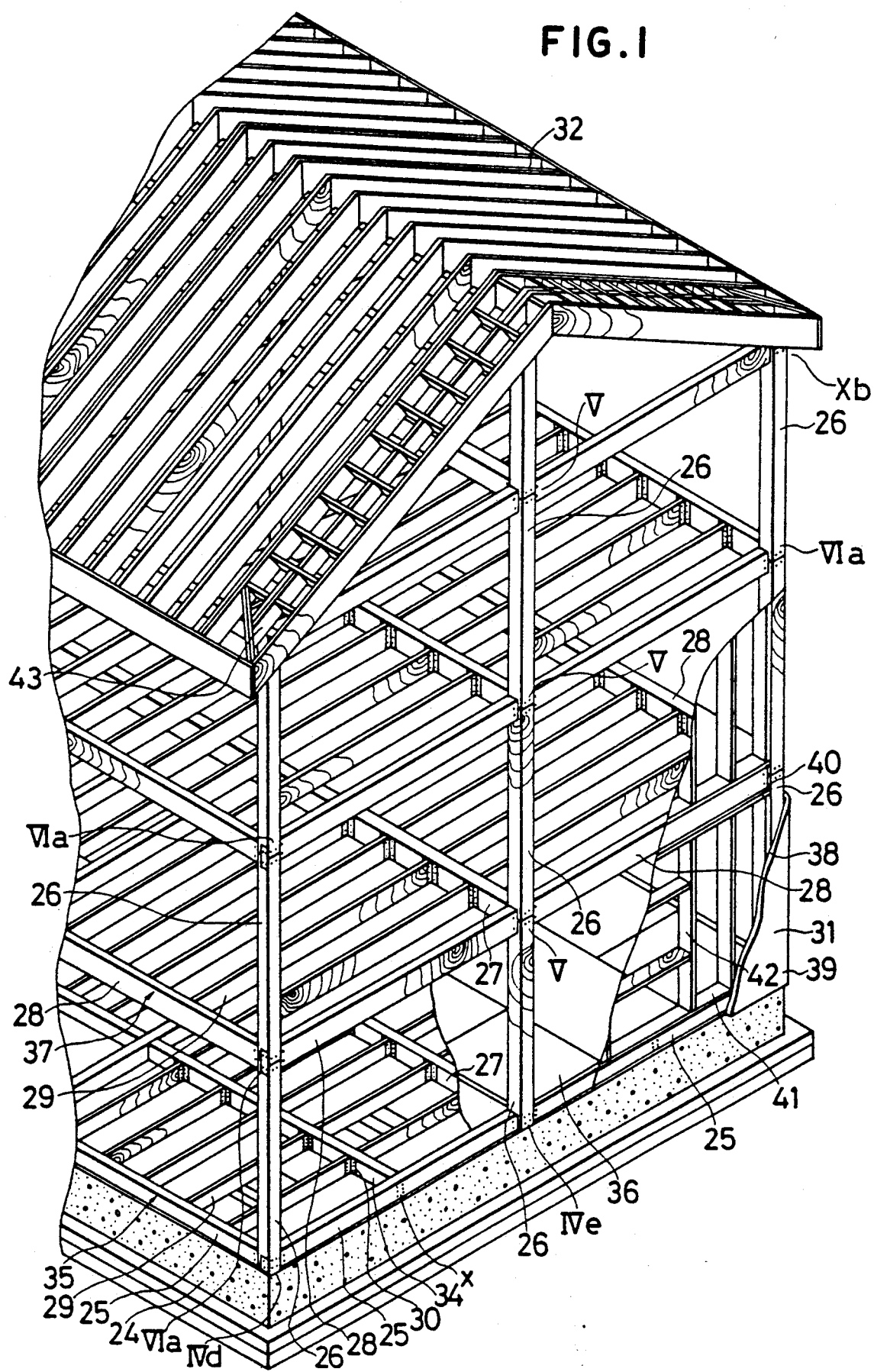
FIG. 1 is a schematic conceptual diagram illustrating a part of an example of a house constructed according to the construction of the present invention.

The construction method of the present invention will now be described with reference to FIGS. 1 and 2 which are schematic conceptual views illustrating buildings constructed according to the construction method of the present invention.

A foundation 24 provided with an anchor bolt, which is necessary for a building to be constructed, is formed as a continuous foundation (fabric foundation).

A floor frame work 35 for a first story portion, assembled by beam members, is formed on the foundation 24. The floor frame work 35 comprises, as the beam members, a groundsill 25, a sleeper 34, a floor beam 27 and a floor joist 29. Joint apparatuses IVd and IVe of the present invention are secured to the anchor bolts (not shown) projected from the foundation 24, and groundsills 25 are coupled with each other and with floor beams 27 by using these joint apparatuses IVd and IVe. The floor joist 29 is connected by using floor joist-receiving fittings 30. The joint apparatuses IVd and IVe will now be described in detail hereinafter.

Many construction plywoods 36 or many face members having a performance comparable or superior to that of the construction plywoods are clamped to the floor frame work constructed in the above-mentioned manner by using coupling members, whereby a floor is formed.

In this state, the floor face is flat and the floor acts as an operation bench for the subsequent operation.

Posts 26 for the first story portion are connected to the joint apparatus secured to the anchor bolt of the foundation 24, and the posts 26 are erected on the floor and a floor frame work 37 for a second story portion, assembled by beam members, is constructed on the posts 26. The floor frame work 37 comprises, as the beam members, floor beams 27, girths 28 and floor joists 29. The girths 28 are coupled with each other and with the floor beams 27 by using the above-mentioned joint apparatuses IVd and IVe. The floor joists 29 are connected by using floor joist-receiving fittings 30 in the same manner as described above.

The so-formed floor acts as a roof of the first story portion, that is, an operational fence against rain and wind. Then, posts 26 are erected and a floor of a subsequent floor portion is constructed, and respective stories are constructed by repeating the above procedures.

According to the method of the present invention, a frame work 38 is fitted into a frame portion formed by the above-mentioned posts 26, groundsills 25 and girths 28 and construction plywoods 31 having a size of 1220 mm × 2440 mm (4 feet × 8 feet) or other similar wall members are clamped to the frame portion, whereby a wall of the building is formed.

The frame work 38 of the wall comprises an upper plate 40, a lower plate 41 and intermediate posts 42 connecting these plates.

The construction plywood 31 is attached to the outer side of the frame portion and a finish material (not shown) such as a gypsum board is attached to the inner side of the plywood 31 with an intermediate heat-insulating material.

In the above-mentioned method, the module is that of 1220 mm × 2440 mm (4 feet × 8 feet), and used members are lumbers for the two-by-four work method and pre-cut members are used for all the members.

The structure of the joint apparatuses Ivd and IVe described above will now be explained.

Figure 2:
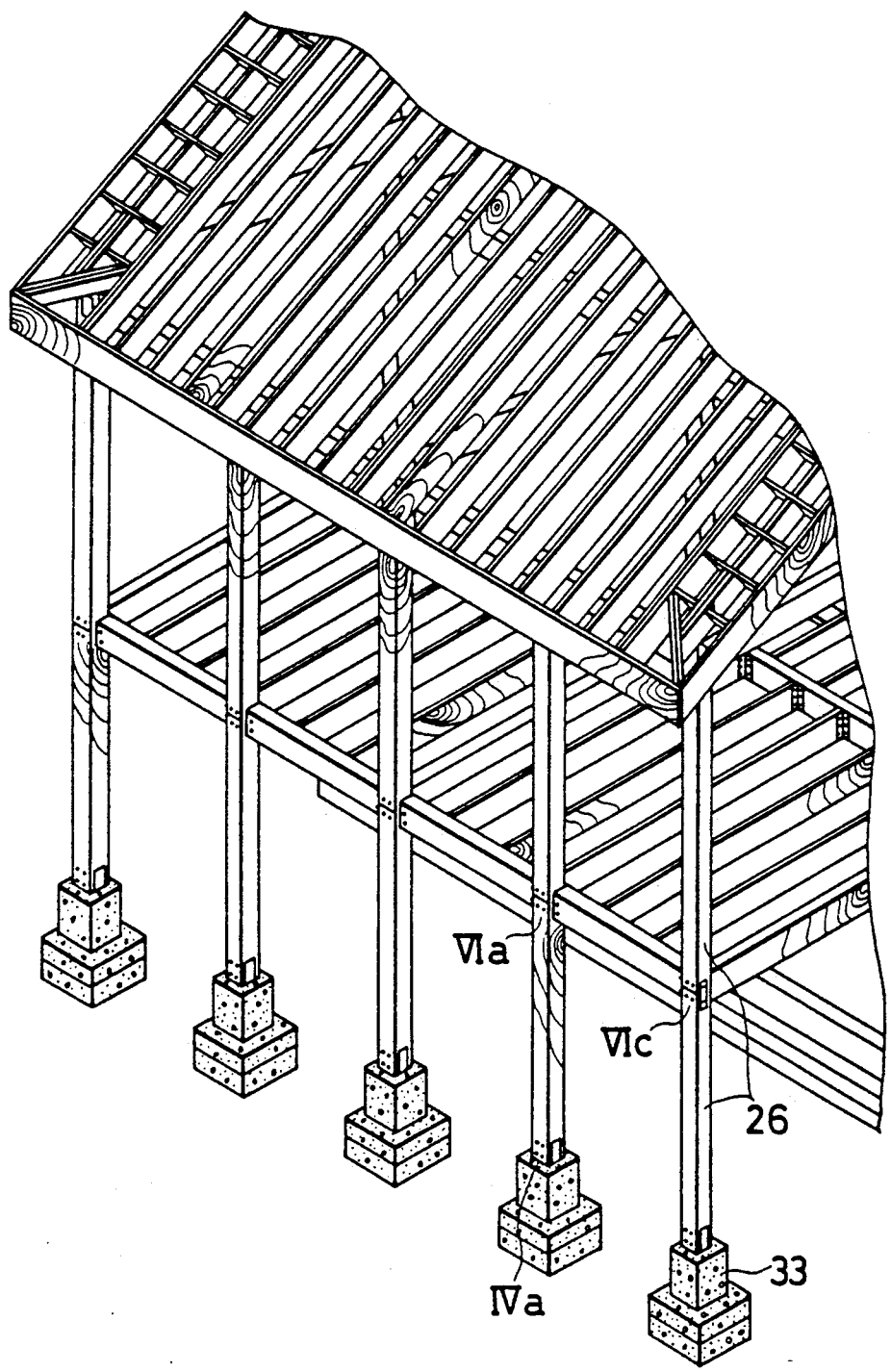
FIG. 2 is a schematic conceptual diagram illustrating a part of another example of a house having an independent foundation different from the fabric foundation shown in FIG. 1, which is constructed according to the construction method of the present invention.
Figure 3:
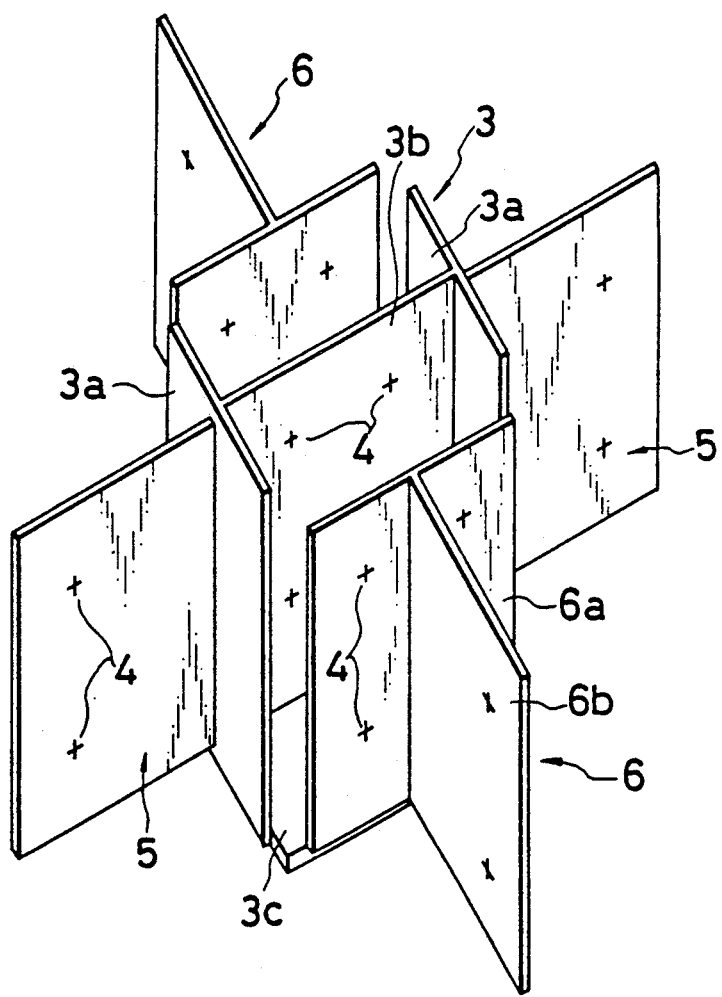
FIG. 3 is a perspective view illustrating a first embodiment of the joint apparatus for construction members according to the present invention which is used in carrying out the construction method of the present invention.
Figure 4A:
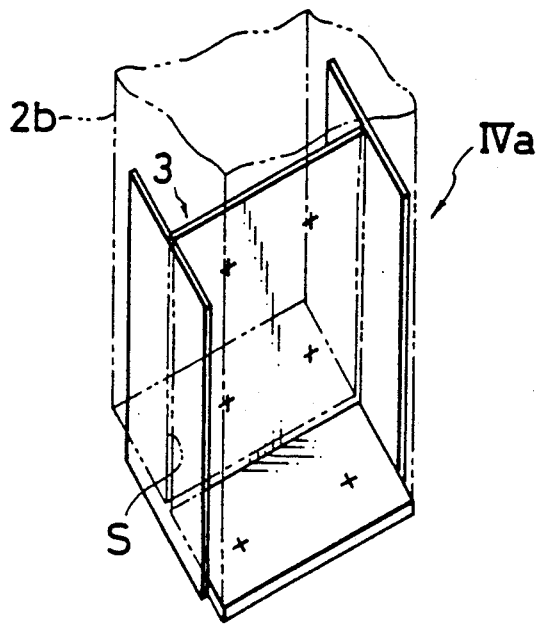
FIGS. 4-(a) through 4-(e) are perspective views showing modifications of the joint apparatus shown in FIG. 3.
Figure 4B:
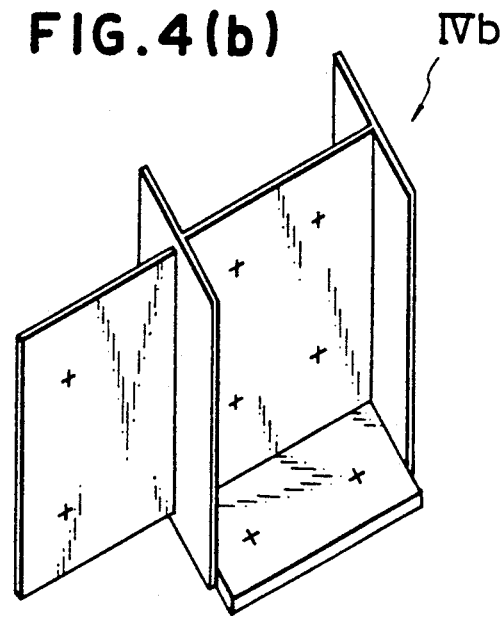
Figure 4C:
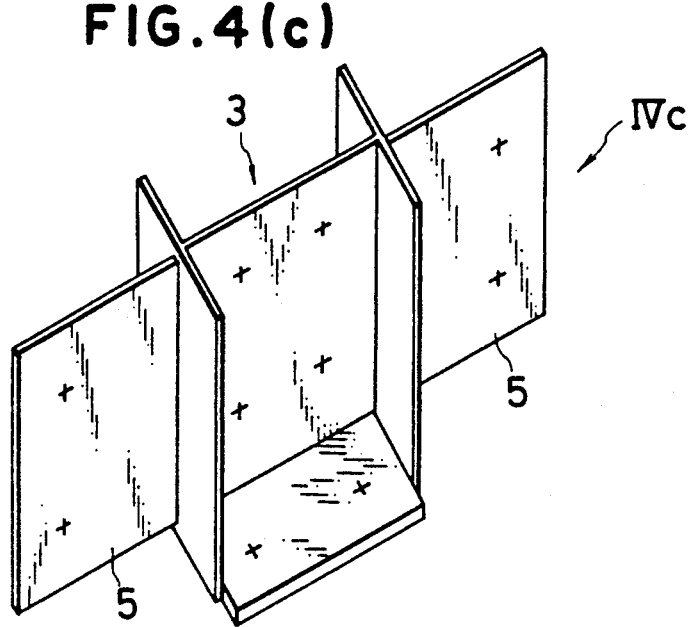
Figure 4D:
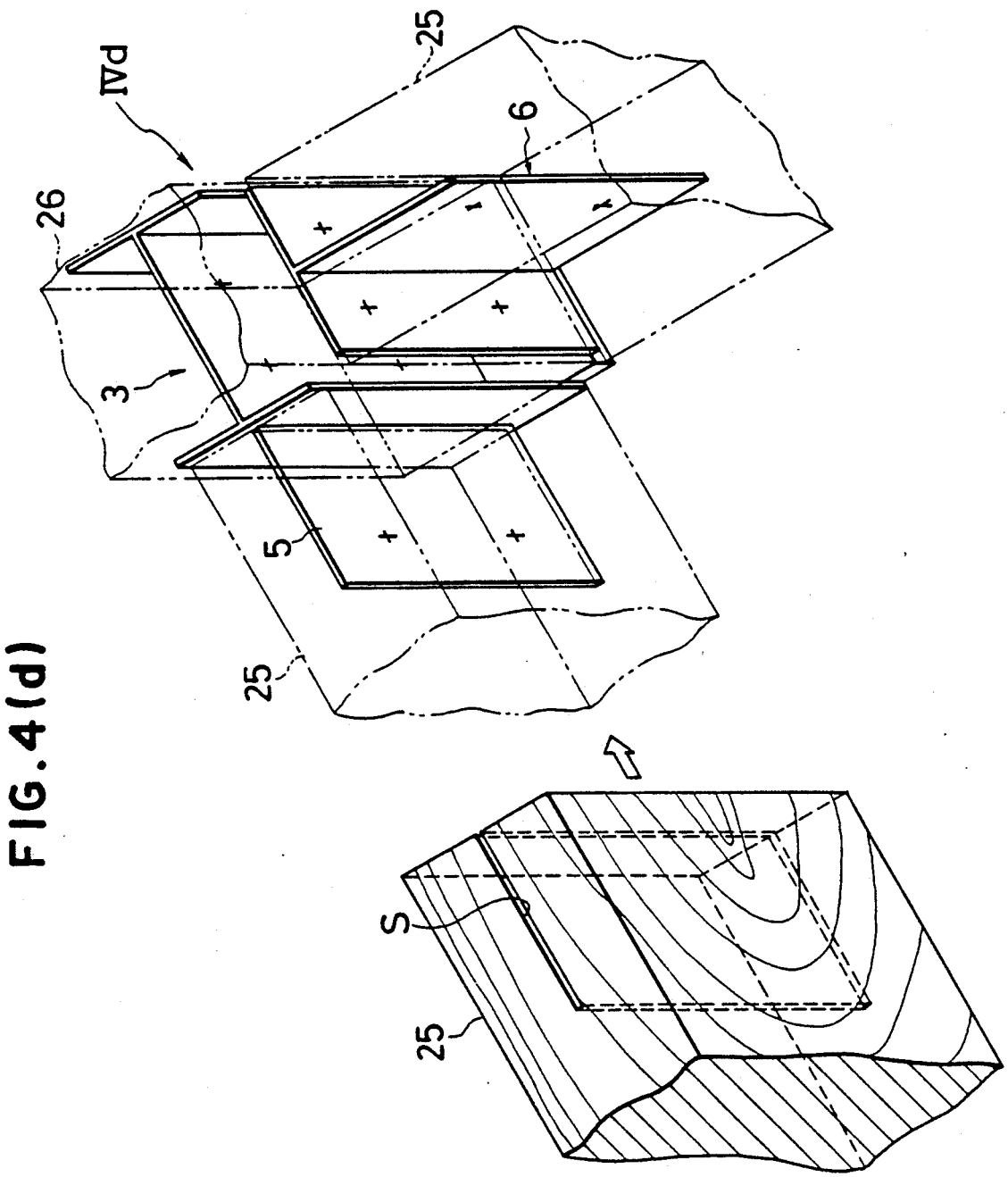
Figure 4E:
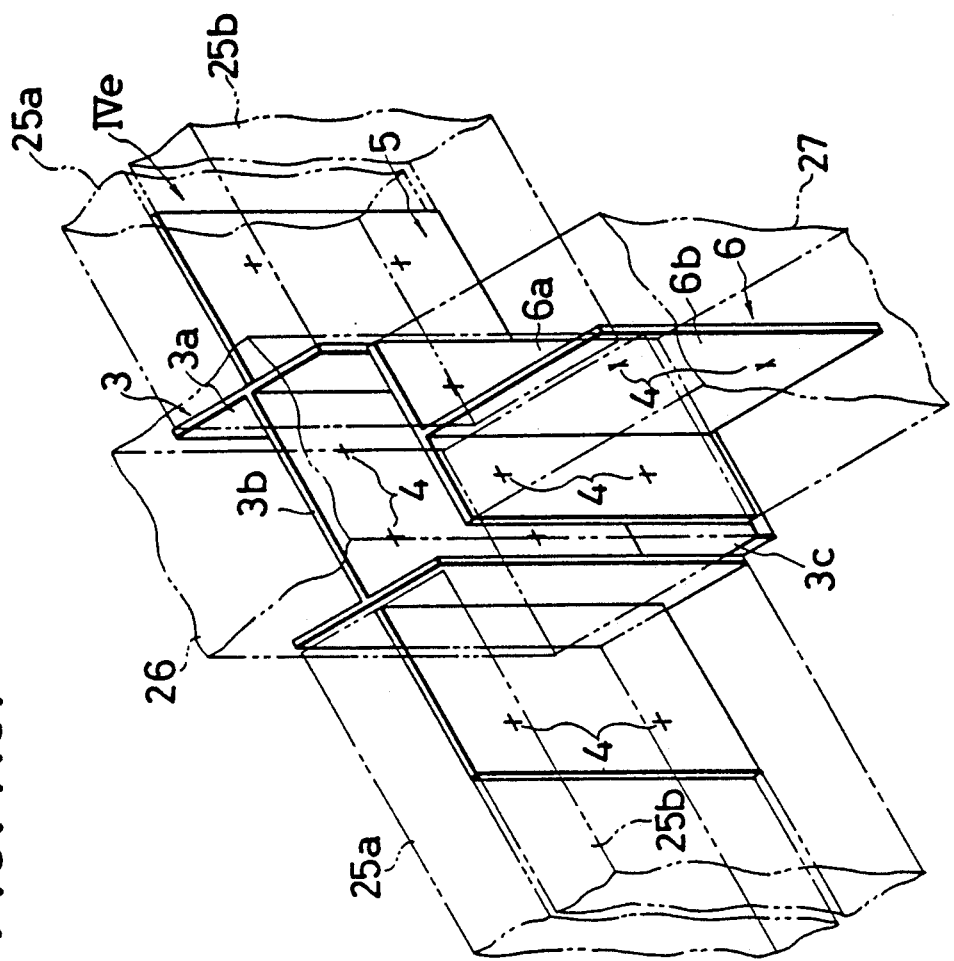
Figure 4E:
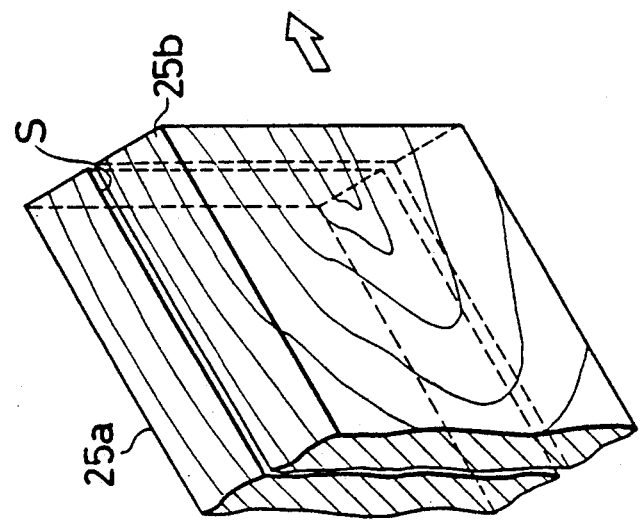

As an example of the joint apparatus, FIG. 3 shows a joint apparatus for coupling the independent foundation 33 and post 26, the fabric foundation 24 and groundsill 25, and the floor beam and post 26, as shown in FIGS. 1 and 2. The joint apparatus for construction members comprises a basic joint member and first and second application joint members selectively combined with the basic joint member.

A pedestal fitting 3 as the basic joint member has an H-figured horizontal section defined by welding a pair of first and second longitudinal side plate portions 3a confronting each other with a predetermined spacing through a longitudinal intermediate plate portion (acting as a connecting plate portion) 3b acting as the clamping portion to the post 26 as the longitudinal construction member. An end plate portion 3c extending substantially orthogonally to the surfaces of the side plate portion 3a and intermediate longitudinal concave groove of the pedestal fitting 3. A light-weight H-beam can be used as the pedestal fitting 3.

Four holes 4 for insertion of bolts as clamping tools are formed in the intermediate plate portion 3b in the pedestal fitting 3. In the present embodiment, the end plate portion 3c acts as the clamping portion to the groundsill 25 and is fixed by welding to the bottom of the H-figured portion. Two holes 4 for insertion of anchor bolts embedded in the independent foundation 33 or fabric foundation 24 shown in FIGS. 1 and 2 are formed in the end plate portion 3c. The width of the end plate portion 3c is adjusted so that the end plate portion 3c projects from the side edge of the side plate portion 3a.

The first application joint member, that is, a groundsill-connecting plate (connecting plate portion) 5 in the present embodiment, has a side end that can be coupled by welding or the like with the outer surface of the first side plate portion 3a in the pedestal fitting 3. Namely, the first application joint member is a plate member extending from the outer surface of the side plate portion 3a in the same plane as the intermediate plate portion 3b and acting as a clamping portion to the groundsill 25 as the lateral construction member. Two holes 4 for insertion of bolts as clamping tools are formed in the groundsill-connecting plate 5.

The second application joint member, that is, a beam-connecting fitting 6 in the present embodiment, can be coupled through a clamping tool with the end portion of the post 26 inserted and connected between the side plate portions 3a and 3b of the pedestal fitting 3 and comprises a third side plate portion 6a acting as a clamping portion to the post 26 and a connecting plate portion 6b extending from the central part of the surface of the side plate portion 6a into the plane substantially orthogonal to said surface and acting as the clamping portion to the groundsill 25 or floor beam 27 as the lateral construction member. A halved light-weight H-beam can be used as the beam-connecting fitting 6.

The joint apparatus for coupling the independent foundation 33 and post 26, the fabric foundation 24 and groundsill 25 and the floor beam 27 and post 26 includes a plurality of modifications differing in the shape, which are assembled by appropriately selecting the numbers and positions of the groundsill-connecting plates 5 and beam-connecting fittings 6 used for the pedestal fitting 3.

Typical examples of such modifications are shown in FIGS. 4-(a) through 4-(e). The modifications shown in FIGS. 4-(a), 4-(d) and 4-(e) are used at positions IVa, IVd and IVe shown in FIGS. 1 and 2. The joint apparatus shown in FIG. 4-(a) is used in the case where only the pedestal fitting 3 is attached, the joint apparatus shown in FIG. 4-(b) is used in the case where one groundsill-connecting plate 5 is attached to the pedestal fitting 3, the joint apparatus shown in FIG. 4-(c) is used in the case where a pair of left and right groundsill-connecting plates 5 are attached to the pedestal fitting 3, the joint apparatus shown in FIG. 4-(d) is used in the case where one groundsill 5 and the beam-connecting fitting 6 are attached to the pedestal fitting 3, and the joint apparatus shown in FIG. 4-(e) is used in the case where a pair of groundsill-connecting plates 5 and the beam-connecting fitting 6 are attached to the pedestal fitting 3. Incidentally, the beam-connecting fitting 6 alone is used at the point X in FIG. 1 for coupling the groundsill 25 and sleeper 34.

Clamping of the post 26, groundsill 25 and floor beam 27 is accomplished, for example, by setting the post 26, groundsill 25 and floor beam 27 at the pedestal fitting 3, groundsill-connecting plate 5 and beam-connecting fitting 6, respectively, so that the connecting plate portions 3b and 6b in the pedestal fitting 3 and beam-connecting fitting 6 and the groundsill-connecting plate 5 are inserted in a groove for example, S shown in FIGS. in 4-(a) and 4-(d) formed in advance by cutting at the centers of the coupling end portions of the post 26, groundsill 25 and floor beam 27, and clamping them by using bolts and like.

For example, in case of the joint apparatus IVe shown in FIG. 4-(e), clamping of the groundsill 25 is accomplished by inserting bolts from the insertion holes of the groundsill 25, inserting the bolts through the insertion holes of the groundsill-connecting plate 5 and fitting the top ends of the bolts in nuts. In this case, the end portion of the groundsill 25 is received by the side plate portion 3a on the side of the pedestal fitting 3.

Clamping of the post 26 is accomplished by inserting bolts from the attachment holes of the side plate portion 6a of the beam-connecting fitting 6, inserting the bolts through the insertion holes of the post 26 and the insertion holes 4 of the side plate portion 3a of the pedestal fitting 3 and fitting the top ends of the bolts in nuts. In this case, the end portion of the post 26 is received by the end plate portion 3c on the side of the pedestal fitting 3.

Clamping of the floor beam 27 is accomplished by inserting bolts from the insertion holes of the floor beam 27, inserting the bolts through the insertion holes 4 of the connecting plate 6b of the beam-connecting fitting 6 and fitting the top ends of the bolts in nuts. In this case, the end portion of the floor beam 27 is received by the side plate portion 6a of the beam-connecting fitting 6.

At the butt face of the post 26 to the end plate 3c on the side of the pedestal fitting 3 and the butt face of the floor beam 27 to the side plate portion 6a of the beam-connecting fitting 6, that is, butt ends, concave face seats in which the heads of the bolts are inserted and located are formed by the seat-boring processing. The respective construction members may be formed to grip the connecting plate portion by parallel long members 25a and 25b as shown in FIG. 4-(e), except the groove S carved in the end portion.

Figure 5:
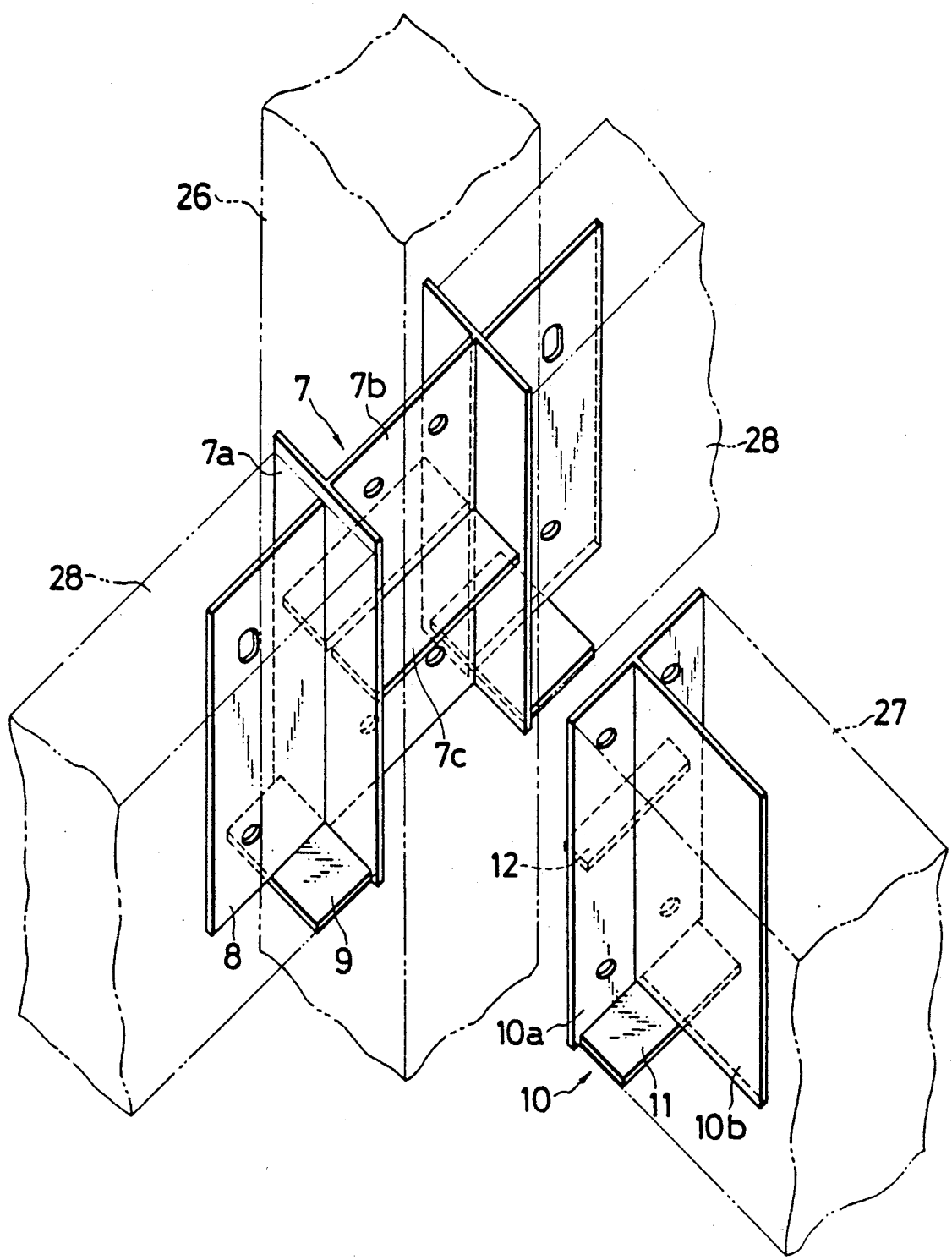
FIG. 5 is a perspective view illustrating a second embodiment of the joint apparatus for construction members according to the present invention.
Figure 6A:
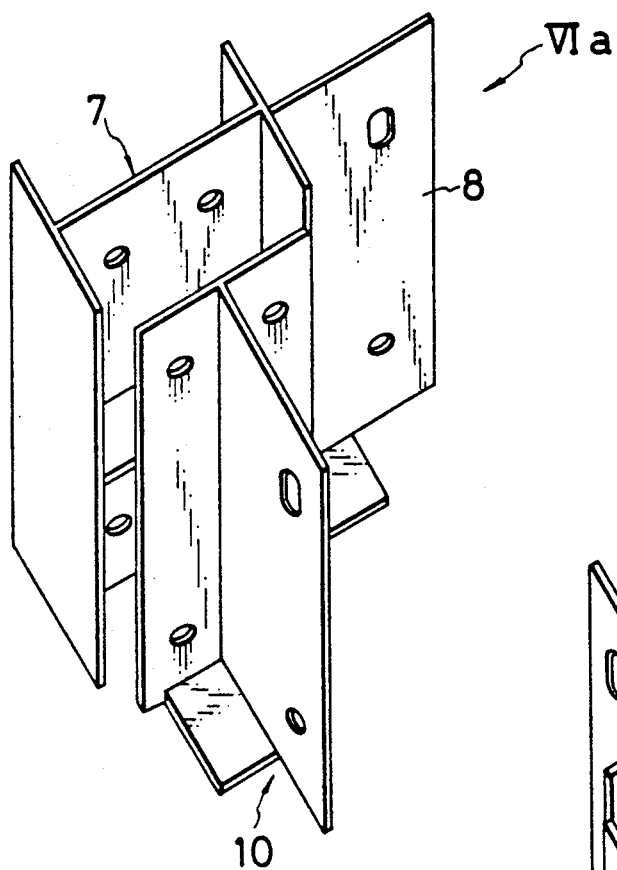
FIGS. 6-(a) through 6-(e) are perspective views showing modifications of the joint apparatus shown in FIG. 5.
Figure 6B:
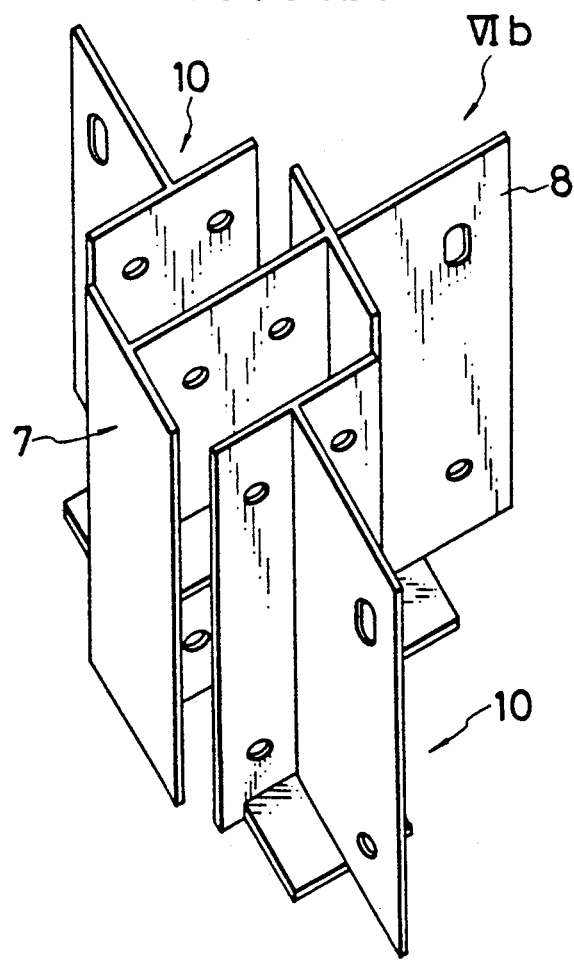
Figure 6C:
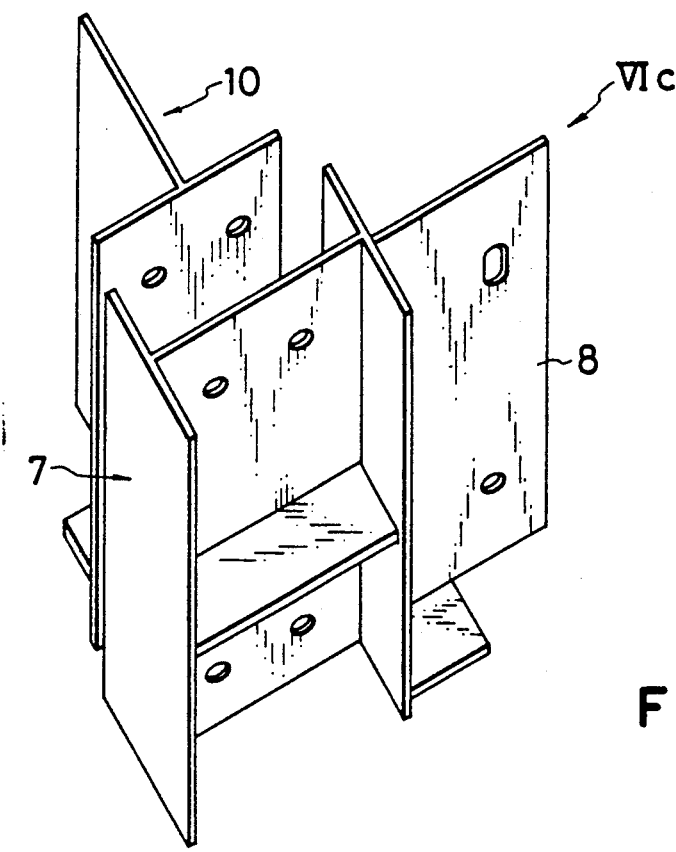
Figure 6D:
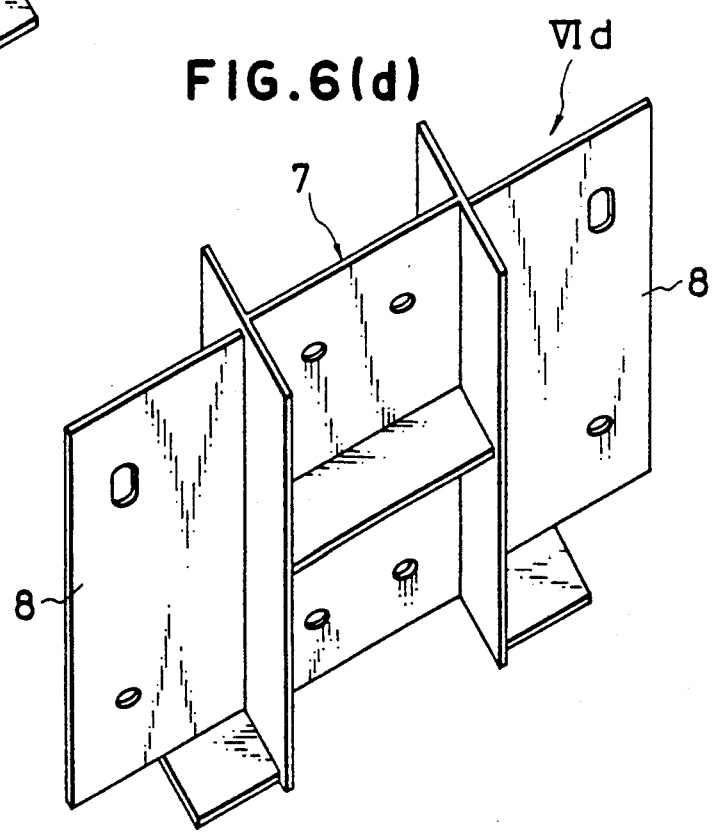
Figure 6E:
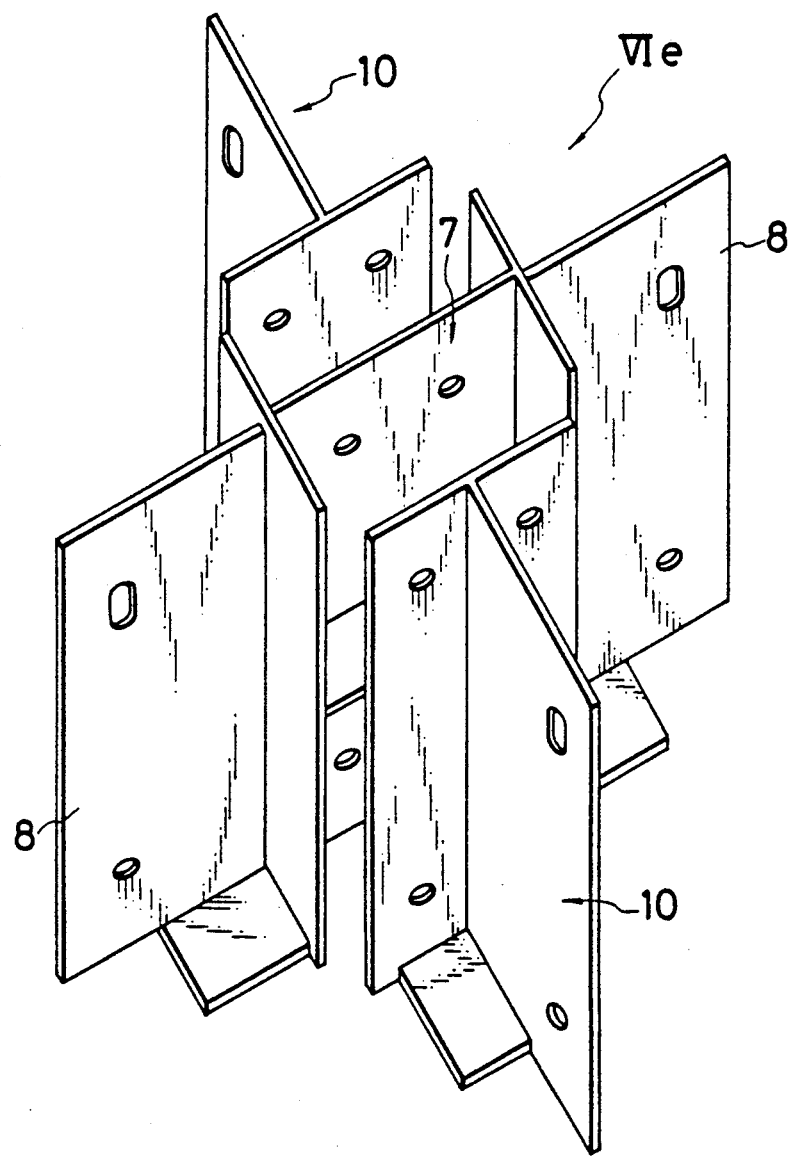

In another embodiment of the joint apparatus shown in FIG. 5, upper and lower posts 26 shown in FIGS. 1 and 2 are coupled with each other, girths 28 as lateral construction members are coupled with each other, and in addition, floor beams 27 are coupled with each other. As in the first embodiment, this joint apparatus comprises a basic joint member and first and second application joint members (modifications of the application joint member shown in FIG. 3) selectively combined with the basic joint member.

A post-connecting fitting 7 in the joint apparatus according to the second embodiment is different from the pedestal fitting 3 in the foregoing embodiment in the fixing position of an end plate portion 7c. Namely, the end plate portion 7c is fixed by welding to side plate portions 7a and an intermediate plate portion 7b at an intermediate position in the longitudinal direction, and the size of the end plate portion 7c is adjusted so that the end plate portion 7c is located inwardly of the side line of the side plate portion 7a.

The third application joint member, that is, a beam-receiving plate (connecting plate portion) 8 in the present embodiment, is different from the above-mentioned groundsill-connecting plate 5 in that the beam-receiving plate 8 has a beam-receiving portion 9.

This beam-receiving portion 9 extends from the lower end of the intermediate plate portion 7b of the post-connecting fitting 7 into a plate substantially orthogonal to the surface of the intermediate plate portion 7b and the surface of the beam-receiving plate 8 and is fixed by welding to the lower ends of the intermediate plate portion 7b and beam-receiving plate 8.

The second application joint member, that is, a beam-receiving fitting 10 in the present embodiment, is different form the beam-connecting fitting 6 in that the beam-receiving fitting 10 has a beam-receiving plate portion 11 and a post-receiving plate portion 12

The beam-receiving plate portion 11 extends form the lower end of a side plate portion 10a of the beam-receiving fitting 10 in a plane substantially orthogonal to the side plate portion 10a and a connecting plate portion 10b and is fixed by welding to the lower ends of both the plate portions 10a and 10b. The post-receiving plate portion 12 extends from the intermediate part in the longitudinal direction of the side plate portion 10a of the beam-receiving fitting 10 into a plane substantially orthogonal to the surface of the side plate portion 10a and is fixed by welding to the lower end of the connecting plate portion 10b. Incidentally, the post-receiving plate portion 12 is located on the same plane as the end plate portion 7c of the connecting fitting 7 to receive the post 26. The beam-receiving portions 9 and 11 act as receiving plates for lateral construction members.

The above-mentioned joint apparatus includes a plurality of modifications which are assembled by appropriately selecting the numbers and positions of the beam-receiving plate 8 and beam-receiving fitting 10 for the post-connecting fitting 7.

Typical examples of such modifications are shown in FIGS. 6-(a) through 6-(e). The modifications shown in FIGS. 5, 6-(a), 6-(c) and 6-(d) are used at the positions V, VIa, VIc and VId shown in FIGS. 1 and 2.

Clamping of the post 26, girth 28 and floor beam 27 to the above-mentioned joint apparatus is performed in the same manner as described above with respect to clamping of the post 26, groundsill 25 and floor beam 27 in the foregoing embodiment. Therefore, explanation of this clamping is omitted.

The positions of the post 26, floor beam 27 and girth 28 to the joint apparatus are shown in FIG. 5.

Figure 7:
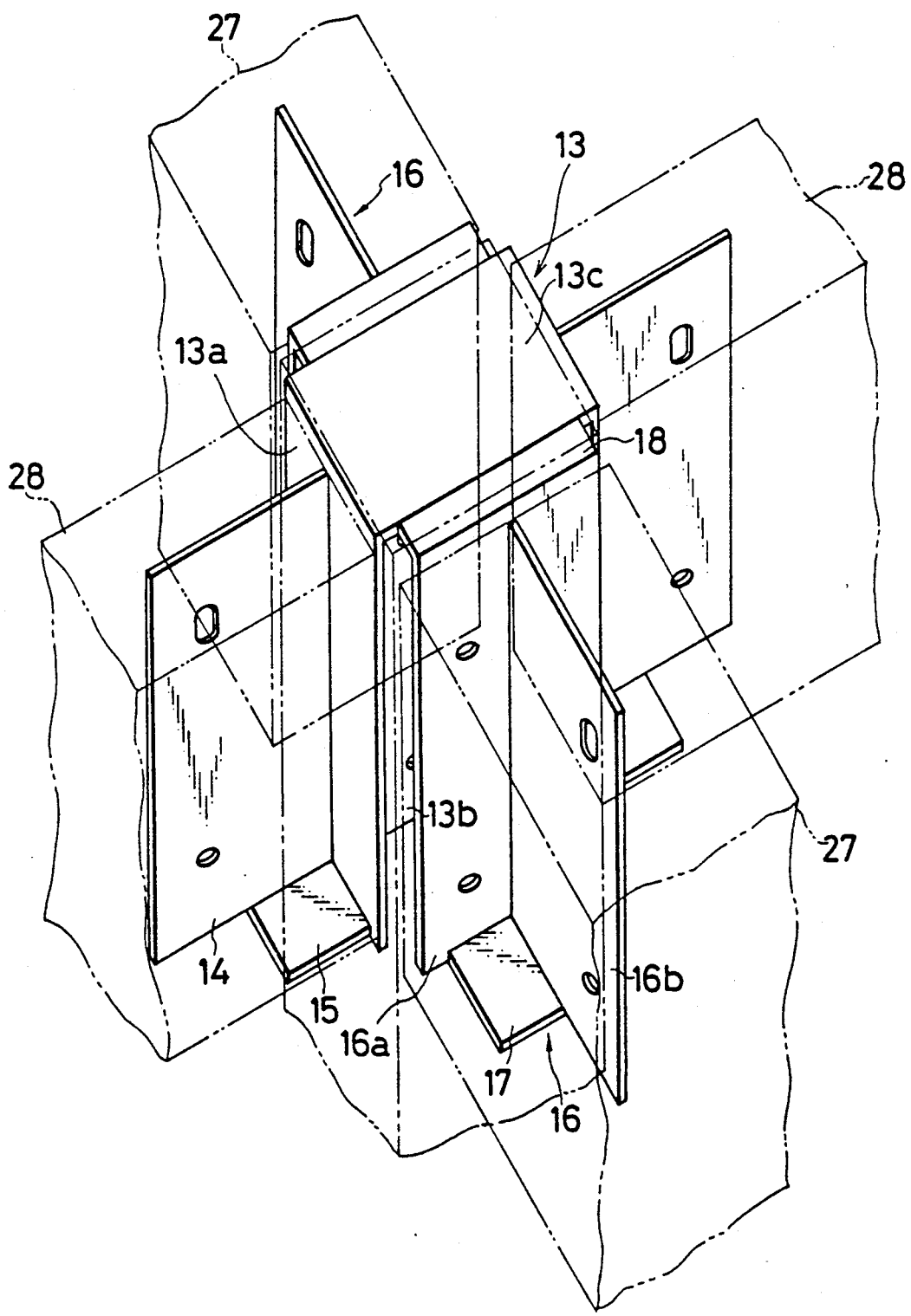
FIG. 7 is a perspective view illustrating a third embodiment of the joint apparatus for construction members according to the present invention.
Figure 8A:
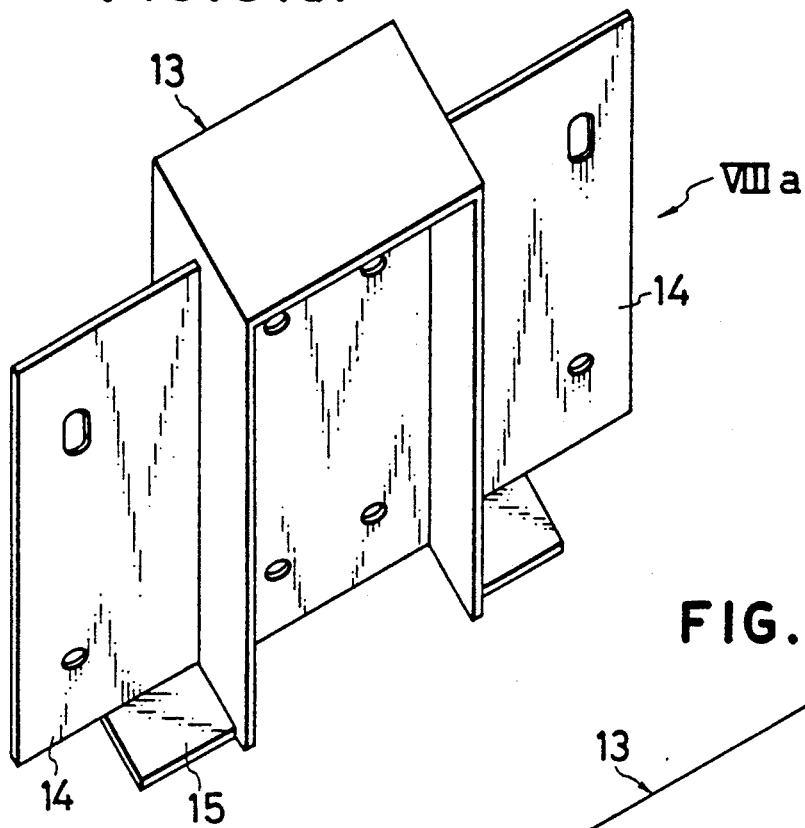
FIGS. 8-(a) through 8-(e) are perspective views showing modifications of the joint apparatus shown in FIG. 7.
Figure 8B:
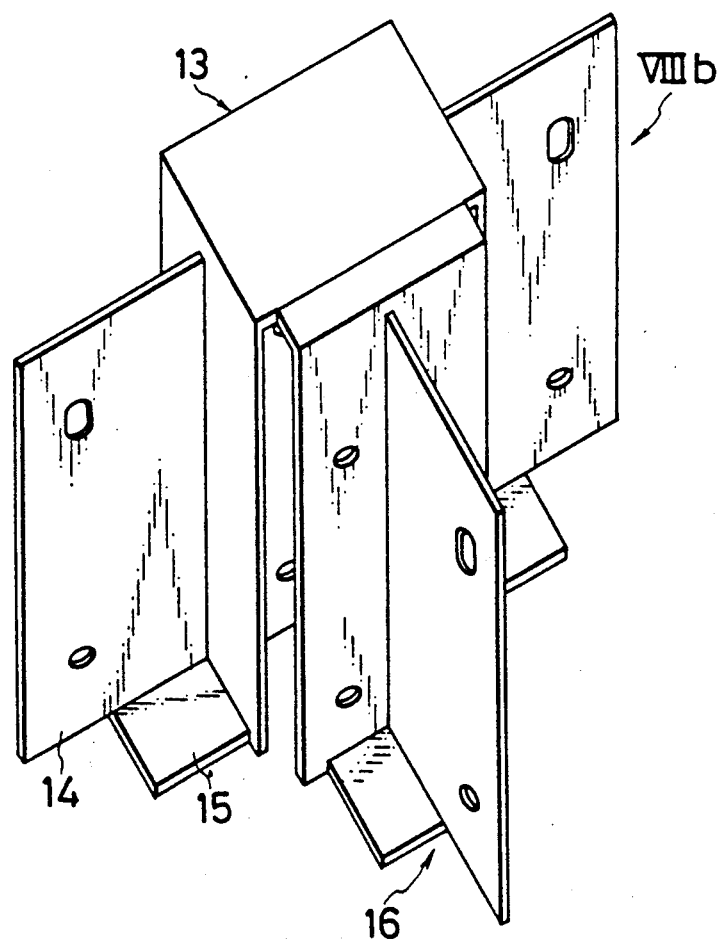
Figure 8C:
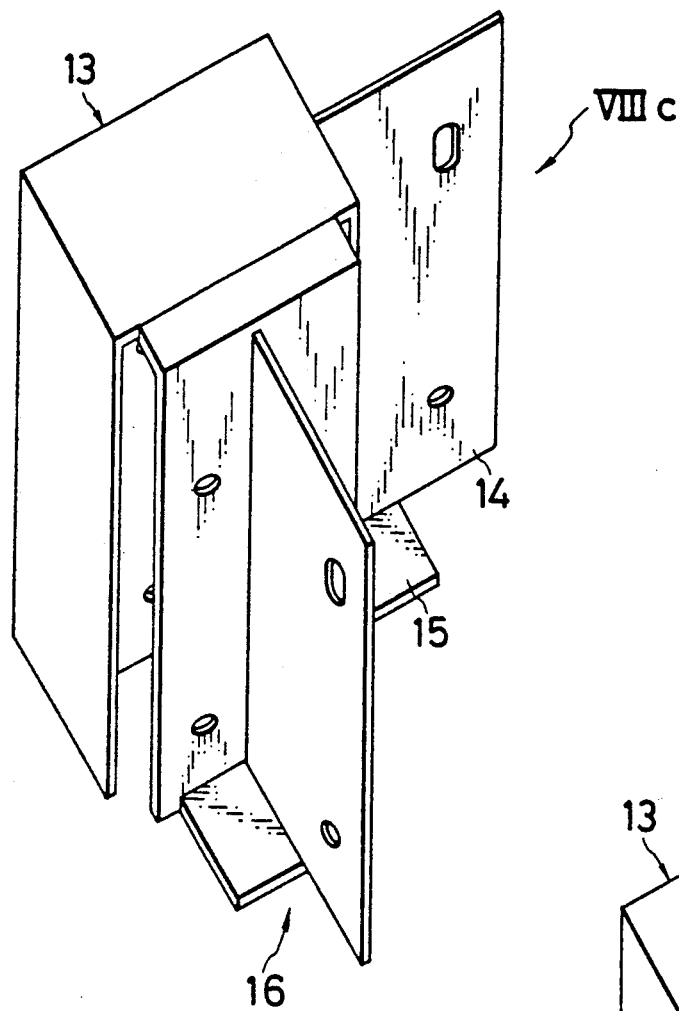
Figure 8D:
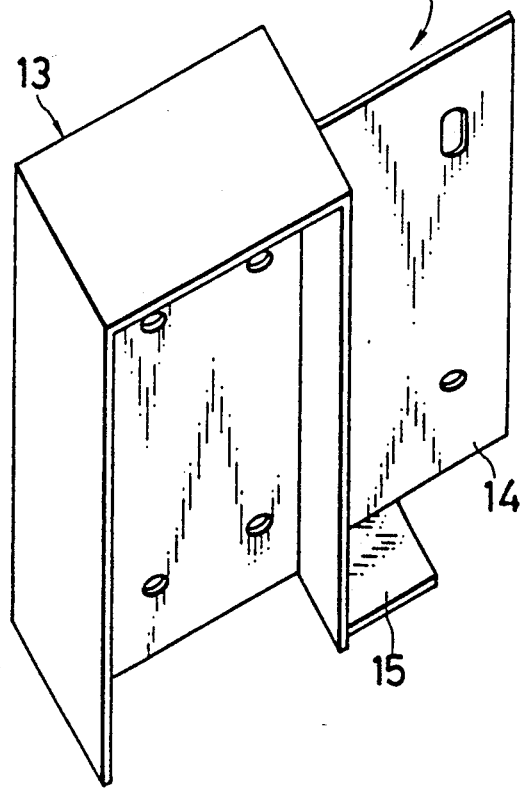
Figure 8E:
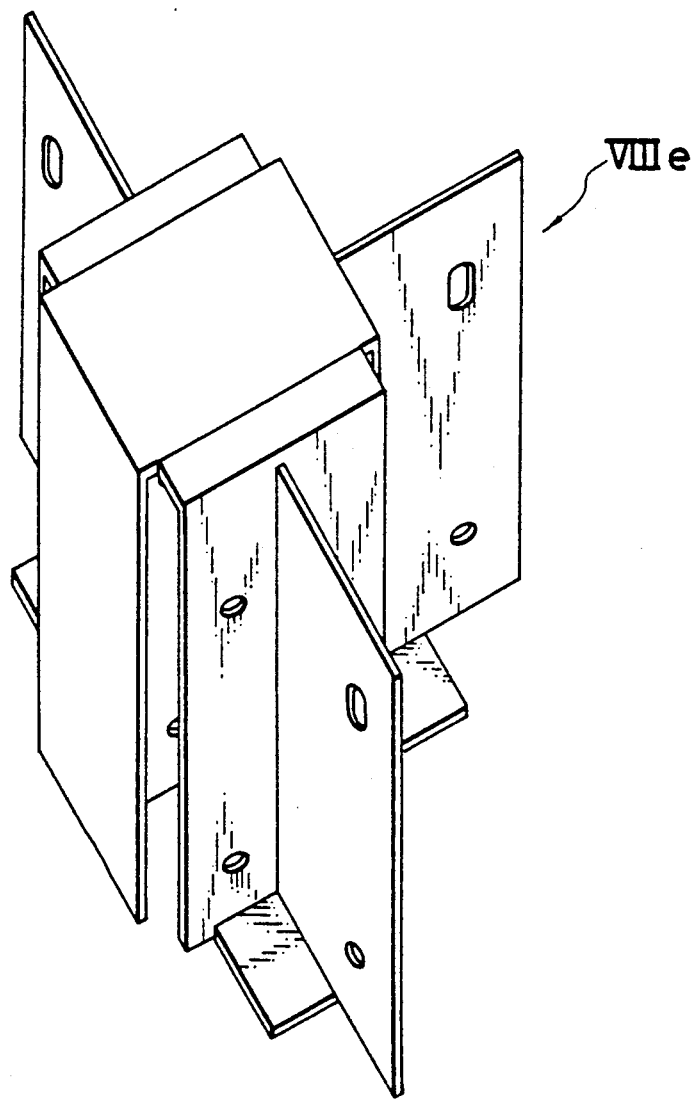

FIG. 7 illustrates a third embodiment of the joint apparatus for construction members. This joint apparatus is used for coupling posts (longitudinal connecting members) 26, girths (lateral connecting members) 28 and roof bows (oblique connecting members) 43 at a capital as shown in FIG. 1.

This joint apparatus comprises a basic joint member and modifications of first and second application joint members which are selectively combined with the basic joint member.

The basic joint member, that is, a pedestal fitting 13, is different from the pedestal fitting 3 and post-connecting fitting 7 of the foregoing embodiments in the fixing position of an end plate portion 13c. Namely, in the present embodiment, the end plate portion 13c acts as the connecting portion of the head of the post 26 and is fixed by welding to the H-figured end portion of the capital. The capital fitting 13 is formed so that the width of the side plate portion 13c is the same as that of a side plate portion 13a. Incidentally, reference numeral 13b represents an intermediate plate portion.

The first application joint member, that is, a beam-receiving plate 14 in the present embodiment, has a beam-receiving plate portion 15 as the beam-receiving plate 8 in the embodiment shown in FIGS. 5 and 6.

The second application joint member, that is, a beam-receiving fitting 16 in the present embodiment, has a beam-receiving plate portion 17 as the beam-receiving fitting 10 in the foregoing embodiment and also has a post-receiving plate portion for receiving a capital portion.

The post-receiving plate portion 18 is fixed by welding to a side plate portion 16a so that the post-receiving plate portion 18 extends from the top end of the side plate portion 16a of the beam-receiving fitting 16.

Incidentally, this post-receiving plate portion 18 is located at the same level as the end plate portion 13c of the capital fitting 13.

Reference numeral 16b represents a connecting plate portion.

The joint apparatus of the present embodiment includes a plurality of modifications assembled by appropriately selecting the numbers and positions of the beam-receiving plate 14 and beam-receiving fitting 16 for the capital fitting 13.

Typical examples VIIIa through VIIIe are shown in FIGS. 8-(a) through 8-(e).

Figure 9:
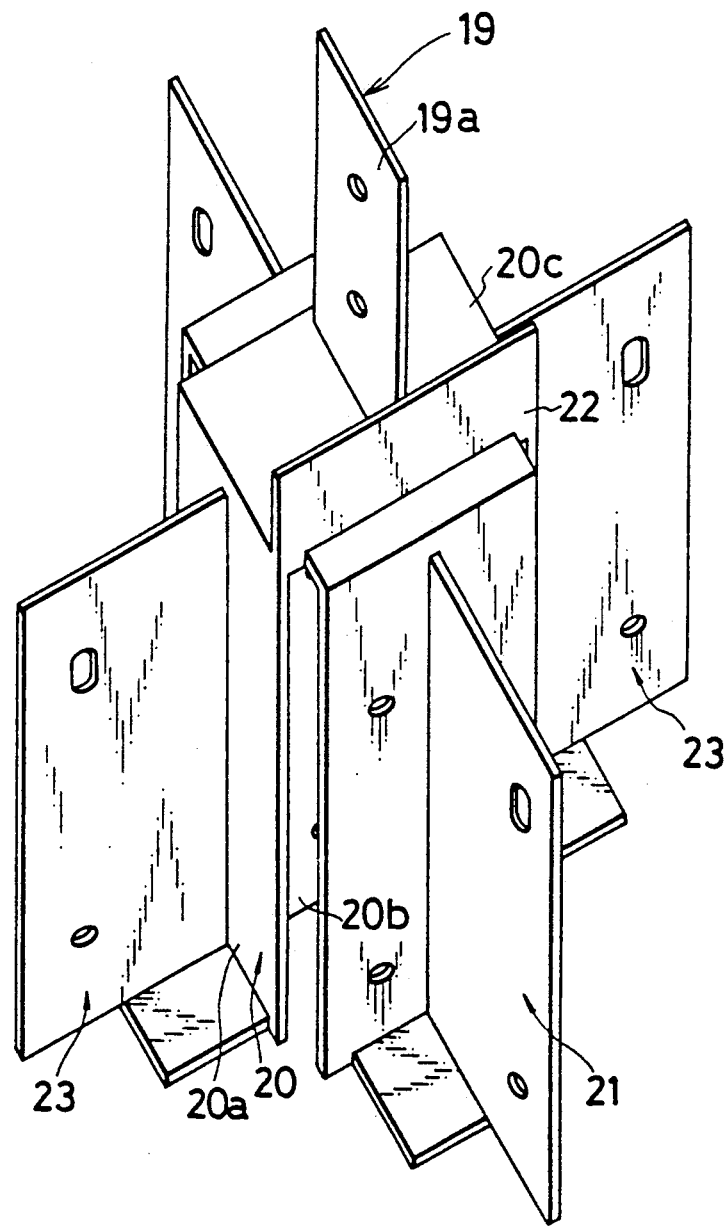
FIG. 9 is a perspective view illustrating a fourth embodiment of joint apparatus for construction members according to present invention.

The joint apparatus for construction members as a fourth embodiment to be used for the capital is illustrated in FIG. 9.

The joint apparatus of the present embodiment is different from the above-mentioned joint apparatus to be used for the capital in that a third application joint member is used.

The third application joint member, that is, a roof bow-receiving plate 19 in the present embodiment, comprises a connecting plate portion 19a acting as a clamping portion to a roof bow 43 as an oblique construction member extending from the central part of the top face of an end plate portion 20c of a pedestal fitting 20 into a plane substantially orthogonal to said top face.

The connecting plate portion 19b is secured so that the connecting plate portion 19b is located on the same plane as a beam receiving fitting 21.

The roof bow-receiving plate 19 is provided with a roof bow-receiving portion 22 extending upwardly from one side edge of the end plate 20c of the capital fitting 20 orthogonal to the connecting plate portion 19a in a plane orthogonal to the connecting plate portion 19a, and this roof bow-receiving portion 22 is welded to the end plate portion 20c. Reference numeral 23 represents a beam-receiving plate.

The joint apparatus for construction members according to the present embodiment includes a plurality of modifications assembled by appropriately selecting the numbers and positions of the roof bow-receiving portion 22, beam-receiving fitting 21 and roof bow-receiving plate 19 for the capital fitting 20.

Figure 10C:
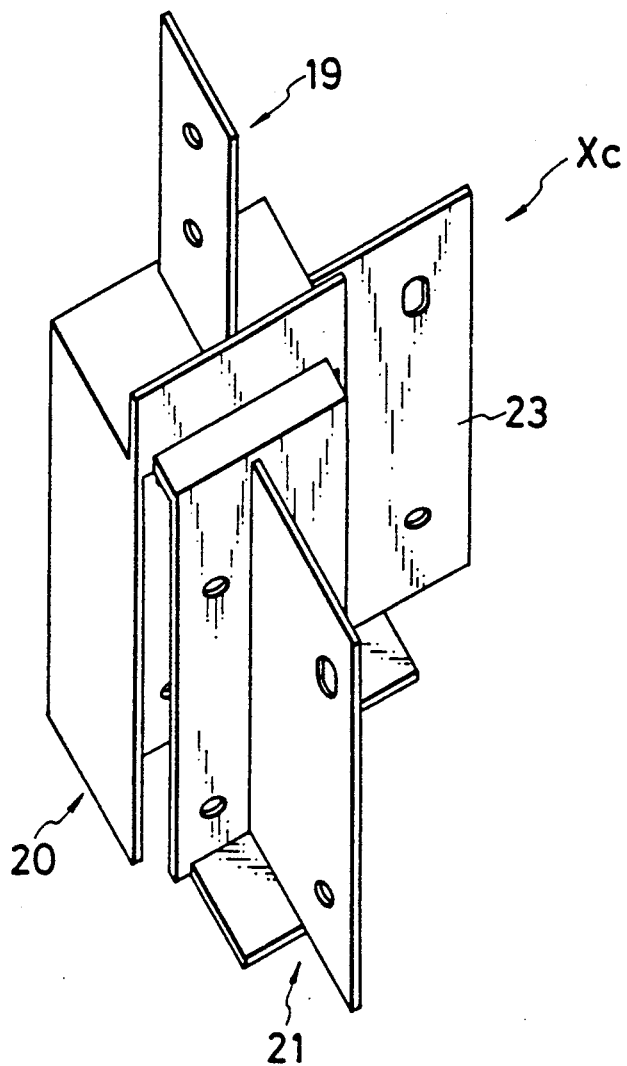
FIGS. 10-(a) through 10-(e) are perspective views showing modifications of the joint apparatus shown in FIG. 9.
Figure 10D:
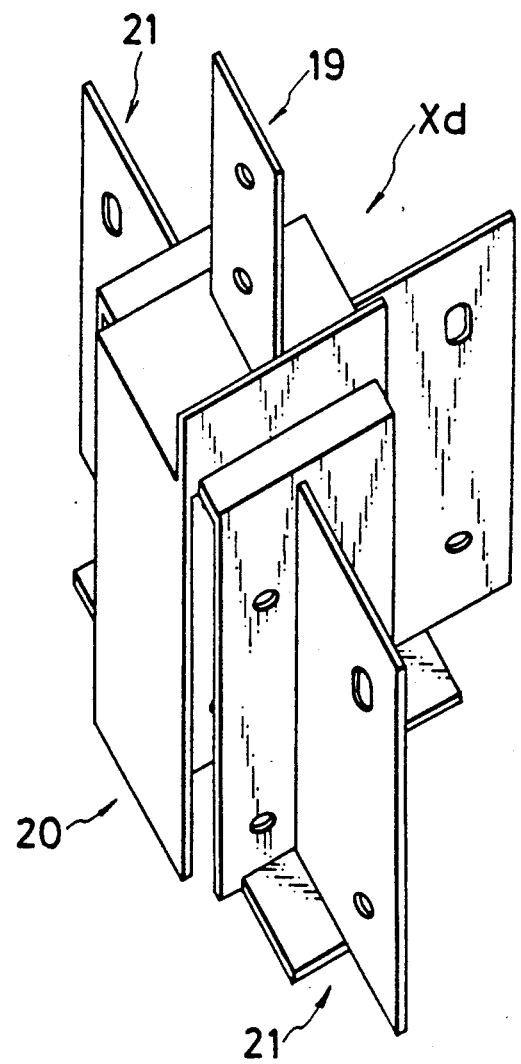
Figure 10E:
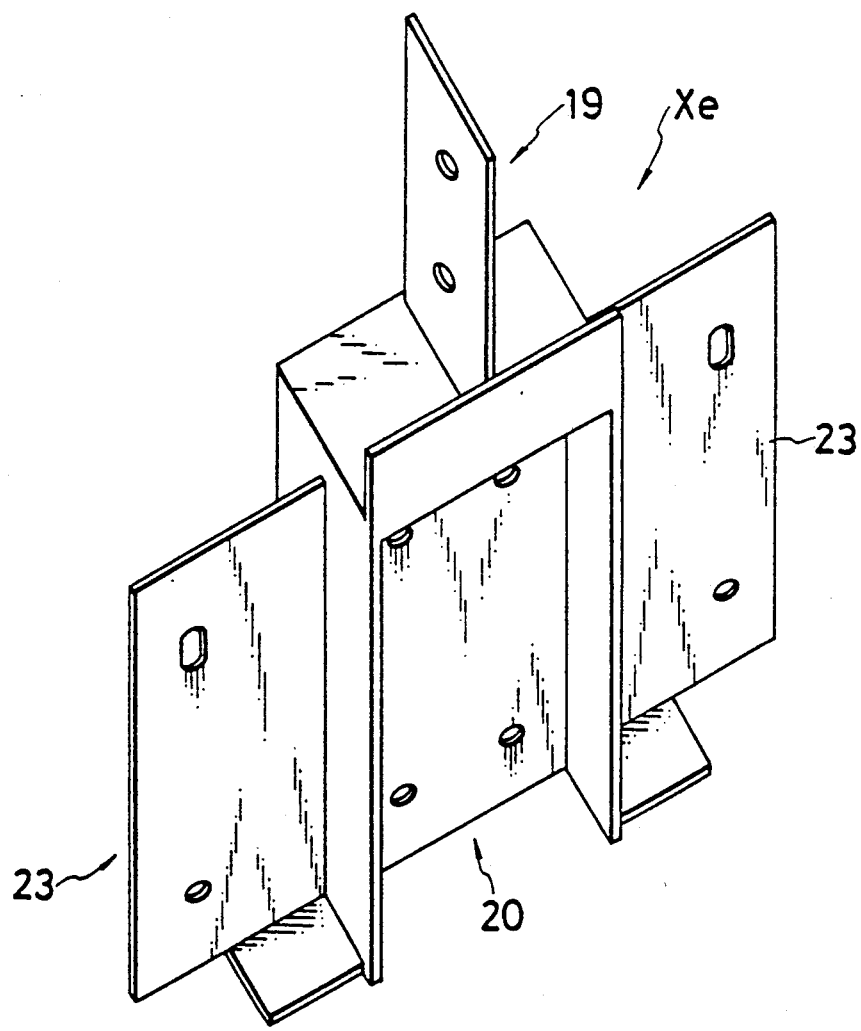

Typical instances Xa through Xe are shown in FIGS. 10-(a) through 10-(e). The modification shown in FIG. 10-(b) is used at the position Xb shown in FIG. 1.

In the above-mentioned construction method, since respective members such as post members and beam members are connected by the above-mentioned peculiar joint apparatus, complicated connections or joints need not be used and there is no dispersion of the structural strength. Moreover, by using standardized joint apparatus, connection can be sequentially performed from one upper portion to another upper portion, as in the multi-storied building construction method, and hence, the operation is carried out very easily and the working time is drastically shortened. Therefore, this construction method is very advantageous from the economical viewpoint.

Since precut timbers are used as the construction members to be coupled by the joint apparatus of the present invention, all the members inclusive of members of the upper ridge portion need not be processed at all.

Bracing of a floor conducted in the conventional methods becomes unnecessary because of the diaphragm theory, and bracing of a wall conducted in the conventional methods becomes unnecessary according to the wall shearing theory, if a force-resistant wall is fabricated by construction plywoods of 4 feet × 8 feet as pointed out hereinbefore.

Moreover, since through posts are not used, the weight of the post members used is not increased, and a crane or the like need not be used, with the result that the construction cost is advantageously reduced.

Still further, since a floor portion, that is, a platform, is first formed in the construction operation, this platform is used as the workshop, the operation is carried out very easily and safely.

Moreover, in each story, the floor of the upper story acts as a roof, and wetting of construction members with rainwater during the construction, which is caused in the two-by-four construction method or the like, can be conveniently avoided.

In the above-mentioned wall structure, the construction per se acts as the foundation of the wall, and therefore, a special foundation need not be formed independently from the wall and a dry working method can be adopted, with the result that the construction time can be shortened.

In view of the above discussed characteristic features for the construction of a building, room arrangement and design can be freely selected, and enlargement and remodeling can be optionally performed and a three-storied building can be easily constructed. Furthermore, skilled experts are not necessary for the construction operation, and it becomes possible to standardized the dimensions of members and reduce the number of kinds of members, Moreover, the present invention is advantageous in that the working operation can be standardized.

Furthermore, if the above-mentioned joint apparatus for construction members is used, coupling and connection of the construction members can be completed only by a simple operation using clamping means such as bolt clamping. The floor space and height can be freely changed by using minimum standard buildings, and if appropriate joint apparatus are used in anticipation of enlargement or remodeling, it is possible to perform enlargement or remodelling very easily. A variety of houses meeting the demands of users can be constructed by using a small number of standard buildings as in the case where various toy blocks differing in the shape are combined. Moreover, since the joint apparatus and the construction members connected by the joint apparatus can be standardized, it is sufficient if all the joint apparatus are prepared in a factory, and the construction members may also be precut in the factory. Still further, the connection of construction members attained by the joint apparatus is very strong and the strength is much higher than the strength attained in the conventional methods using iron plates, bolts and nuts.

The prominent characteristic features of the joint apparatus of the present invention are as follows.

Since a joint member having an H-figured shape is used as the basic joint member instead of the conventional joint proper having a cubic or trapezoidal shape, the weight of the joint apparatus and the quantity of the material can be reduced, and therefore, the construction cost can be reduced.

Instead of the method in which all the plate members are secured in advance to the joint proper, there is adopted the method in which only necessary application joint members are welded to the basic joint member and a small number of kinds of remaining application joint members are secured to construction members connected to the basic joint member afterward at the construction field. Therefore, the weight of the joint apparatus handled is reduced and the operation of connecting the construction members is facilitated.

Moreover, since a small number of kinds of application joint members are secured to the construction members at the construction field as described above, registration of the positions of the construction members at the time of attachment thereof is simplified and the operation efficiency is highly improved.

Still further, in the joint apparatus having the above-mentioned structure, since a small number of kinds of application joint members are connected to the construction members by bolts or the like according to need, even if the shape, number and direction of the application joint member are wrong, the errors can be easily corrected and no severe control of errors is necessary, and a troublesome operation of exchanging the entire joint apparatus, which is necessary in the conventional methods, is not necessary, with the result that the operation efficiency can be improved.

I claim:

1. A process for constructing a building on a foundation, comprising connecting construction members including at least one longitudinal construction member and at least one lateral construction member, said longitudinal and lateral construction members being made of timber, with a joint apparatus, comprising providing a basic joint member including at least first and second application joint members;

said basic joint member comprising first and second plate portions, each of said first and second plate portions having an outer face and an inner face, with the inner face of said first and second plate portions facing each other and spaced apart a predetermined distance, an intermediate plate portion extending between and having both of its ends fixed to a substantially central portion of the inner faces to connect said first and second side plate portions, means forming first apertures located in said intermediate plate portion for insertion of clamping means which comprise a bolt-nut assembly, a lateral end plate portion having portions secured to said first and second side plate portions and said intermediate plate portion, and said basic joint member having an H-shaped lateral cross-section defining a space in which an end portion of said at least one first longitudinal construction member is inserted;

said first application joint member comprises a first coupling plate portion having means forming second apertures for insertion of clamping means which comprise a bolt-nut assembly, said first coupling plate portion having one end fixed to a substantially central portion of the outer face of one of said first or second side plate portions and extending substantially parallel to said intermediate plate portion and capable of coupling said at least one lateral construction member;

said second application joint member comprising a third side plate portion including means forming third apertures for insertion of clamping means which comprise a bolt-nut assembly, a second coupling plate portion having an end portion secured to a substantially central portion of said third side plate and having means forming fourth apertures for insertion of clamping means which comprise a bolt-nut assembly for coupling a second lateral construction member, said third side plate portion is mounted to abut said at least one first longitudinal construction member fitted in said basic joint member, and to extend substantially parallel to said intermediate plate portion located in an end portion of said first longitudinal construction member, with said second coupling plate extending substantially parallel to said first and second side plate portions, and extending orthogonally to the first lateral construction member; and attaching and clamping said at least one lateral construction member to said first coupling plate, attaching and clamping said at least one longitudinal construction member to said intermediate plate portion, and attaching and clamping said third side plate portion to said at least one first longitudinal construction member.

2. The construction method according to claim 1, wherein said at least one longitudinal and lateral construction members are precut into standard sizes.

3. The construction method according to claim 2, further comprising cutting a groove in an end portion of said at least one longitudinal construction member, and placing said groove over said intermediate plate portion.

4. The construction method according to claim 2, further comprising cutting a groove in an end portion of said at least one lateral construction member, and placing said groove over said first or second coupling plate portion.

5. The construction method according to claim 2, wherein at least one of said at least one longitudinal construction member and said at least one lateral construction member comprises a pair of elongated-parallel members.

6. The construction method according to claim 1, wherein the construction members further include at least one oblique construction member, said joint apparatus further comprises a third application joint member comprising a third coupling plate portion for fixation and attachment of said oblique construction member, which extends from a substantially central portion of said lateral end plate portion perpendicular to said lateral end plate portion, and said at least one oblique construction member is attached and clamped to said third coupling plate portion.

7. The construction method according to claim 6, wherein said at least one longitudinal and lateral construction members are precut into standard sizes.

8. The construction method according to claim 7, further comprising cutting a groove in an end portion of said at least one longitudinal construction member, and placing said groove over said intermediate plate portion.

9. The construction method according to claim 7, further comprising cutting a groove in an end portion of said at least one lateral construction member, and placing said groove over said first or second coupling plate portion.

10. The construction method according to claim 7, wherein at least one of said at least one longitudinal construction member and said at least one lateral construction member comprises a pair of elongated parallel members.

11. The construction method according to claim 6, which further comprises the step of constructing a floor frame work of each story by combining the at least one longitudinal and lateral construction members and clamping face members to floor frame works of respective stores in sequence from a lower story to an upper story to form floors of the respective stores, wherein during the construction, the floor is used as a platform and a roof for the lower story.

12. The construction method according to claim 6, which further comprises the step of constructing a wall frame work by combining the at least one longitudinal and lateral construction members, fitting a frame work in an inner circumferential face formed by the wall frame work and clamping a wall member to said frame work to form a wall.

13. A building structure including a plurality of construction members connected together by joint apparatus comprising a basic joint member including at least first and second application joint members;

said basic joint member comprising a pair of first and second plate portions, each of said first and second plate portions having an outer face and an inner face, with the inner face of said first and second plate portions facing each other and spaced apart a predetermined distance, an intermediate plate portion extending between and having both of its ends fixed to a substantially central portion of the inner faces to connect said first and second side plate portions, means forming first apertures located in said intermediate plate portion for insertion of clamping means which comprise a bolt-nut assembly, a lateral end plate portion having portions secured to said first and second side plate portions and said intermediate plate portion, and said basic joint member having an H-shaped lateral cross-section defining a space in which an end portion of at least one first longitudinal construction member made of timber is inserted;

said first application joint member comprises a first coupling plate portion having means forming second apertures for insertion of clamping means which comprise a bolt-nut assembly, said first coupling plate portion having one end fixed to a substantially central portion of the outer face of one of said first or second side plate portions and extending substantially parallel to said intermediate plate portion and capable of coupling a first lateral construction member made of timber;

said second application joint member comprising a third side plate portion including means forming third apertures for insertion of clamping means which comprise a bolt-nut assembly, a second coupling plate portion having an end portion secured to a substantially central portion of said third side plate and having means forming fourth apertures for insertion of clamping means which comprise a bolt-nut assembly for coupling a second lateral construction member made of timber,
said third side plate portion being mounted to abut the first longitudinal construction member fitted in said basic joint member, and extend substantially parallel to said intermediate plate portion located in an end portion of the first longitudinal construction member, with said second coupling plate extending substantially parallel to the first and second side plate portion, and extending orthogonally to the first lateral construction member.

14. A joint apparatus for construction members comprising a basic joint member including at least first and second application joint members;
said basic joint member comprising
a pair of first and second plate portions, each of said first and second plate portions having an outer face and an inner face, with the inner face of said first and second plate portions facing each other and spaced apart a predetermined distance,
an intermediate plate portion extending between and having both of its ends fixed to a substantially central portion of the inner faces to connect said first and second side plate portions,
means forming first apertures located in said intermediate plate portion for insertion of clamping means which comprise a bolt-nut assembly,
a lateral end plate portion having portions secured to said first and second side plate portions and said intermediate plate portion, and
said basic joint member having an H-shaped lateral cross-section defining a space in which an end portion of at least one first longitudinal construction member made of timber is adapted to fit;
said first application joint member comprises a first coupling plate portion having means forming second apertures for insertion of clamping means which comprise a bolt-nut assembly,
said first coupling plate portion having one end fixed to a substantially central portion of the outer face of one of said first or second side plate portions and extending substantially parallel to said intermediate plate portion and capable of coupling a first lateral construction member made of timber;
said second application joint member comprising a third side plate portion including means forming third apertures for insertion of clamping means which comprise a bolt-nut assembly, a second coupling plate portion having an end portion secured to a substantially central portion of said third side plate and having means forming fourth apertures for insertion of clamping means which comprise a bolt-nut assembly for coupling a second lateral construction member made of timber,
said third side plate portion being adapted to be mounted during use to abut the first longitudinal construction member fitted in said basic joint member, and extend substantially parallel to said intermediate plate portion located in an end portion of the first longitudinal construction member, with said second coupling plate extending substantially parallel to the first and second side plate portions, and extending orthogonally to the first lateral construction member.

15. The joint apparatus as set forth in claim 14, further comprising a bolt-nut assembly.

16. The joint apparatus as set forth in claim 14, wherein means forming fifth apertures are located in said lateral end plate portion.

17. The joint apparatus as set forth in claim 14, wherein said lateral end plate portion is secured to lower end portions of said first side plate portion, said second side plate portion, and said intermediate plate portion, to thereby be capable of supporting a lower end portion of the first longitudinal construction member above said lateral end plate portion.

18. The joint apparatus as set forth in claim 14, wherein said lateral end plate portion is secured at substantially intermediate-height positions on said first side plate portion, said second side plate portion and said intermediate plate portion, to thereby be capable of supporting a lower end portion of the first longitudinal construction member above said lateral end plate portion, and said lateral end plate portion is adapted to be placed on an upper end of another longitudinal construction member.

19. The joint apparatus as set forth in claim 14, wherein said first application joint member further comprises a first receiving plate portion secured to lower end portions of at least one side plate portion of the basic joint member and said first coupling plate portion and extending in a lateral direction, to thereby be capable of supporting a lower face of one end portion of the first lateral construction member.

20. The joint apparatus as set forth in claim 14, wherein the second application joint member further comprises a second receiving plate portion secured to lower end portions of said third side plate portion and said second coupling plate portion and extending in a lateral direction, to thereby be capable of supporting a lower face of one end portion of the second lateral construction member.

21. The joint apparatus as set forth in claim 14, wherein said lateral end plate portion is secured to upper end portions of said first side plate portion, said second side plate portion and said intermediate plate portion, to thereby be adapted to be placed on an upper end face of the first longitudinal construction member located below.

22. The joint apparatus as set forth in claim 21, wherein said second application joint member includes a receiving plate portion laterally extending from an upper end portion of said third side plate portion and attached to said lateral end plate portion.

23. The joint apparatus as set forth in claim 14, which further comprises a third application joint member comprising a third coupling plate portion for fixation and attachment of an oblique construction member, said third coupling plate portion extends from a substantially central portion of said lateral end plate portion in a direction substantially perpendicular to said lateral end plate portion.

24. The joint apparatus as set forth in claim 23, wherein the lateral end plate portion is secured to upper end portions of said first side plate portion, said second side plate portion and said intermediate plate portion.

25. The apparatus as set forth in claim 24, wherein said third application joint member further comprises a fourth receiving plate portion extending upwardly from one of said first and second side plate portions, and substantially perpendicular to said third coupling plate portion and capable of impinging an end portion of the oblique construction member.

26. A joint apparatus for construction members comprising
   a basic joint member;
   said basic joint member comprising
      a pair of first and second substantially solid plate portions, each of said first and second plate portions having an outer face and an inner face, with the inner face of said first and second plate portions facing each other and spaced apart a predetermined distance,
      an intermediate substantially solid plate portion extending between and having both of its ends fixed to a substantially central portion of the inner faces to connect said first and second side plate portions,
      a lateral end plate portion having portions secured to said first and second side plate portions and said intermediate plate portion,
      means forming first apertures located in said lateral end plate portion for insertion of clamping means which comprise a bolt-nut assembly,
      means forming second apertures located in said intermediate plate portion for insertion of clamping means which comprise a bolt-nut assembly, and
      said basic joint member having an H-shaped lateral cross-section defining a space in which an end portion of at least one first longitudinal construction member made of timber is adapted to fit.

27. The joint apparatus as set forth in claim 26, further comprising a bolt-nut assembly.

28. The joint apparatus as set forth in claim 26, wherein said lateral end plate portion is secured to lower end portions of said first side plate portion, said second side plate portion, and said intermediate plate portion, to thereby be capable of supporting a lower end portion of the first longitudinal construction member above said lateral end plate portion.

29. The joint apparatus as set forth in claim 26, wherein said lateral end plate portion is secured at substantially intermediate-height positions on said first side plate portion, said second side plate portion and said intermediate plate portion, to thereby be capable of supporting a lower end portion of the first longitudinal construction member above said lateral end plate portion, and said lateral end plate portion is adapted to be placed on an upper end of another longitudinal construction member.

30. A joint apparatus for construction members comprising
   a basic joint member including at least a first application joint member;
   said basic joint member comprising
      a pair of first and second plate portions, each of said first and second plate portions having an outer face and an inner face, with the inner face of said first and second plate portions facing each other and spaced apart a predetermined distance,
      an intermediate plate portion extending between and having both of its ends fixed to a substantially central portion of the inner faces to connect said first and second side plate portions,
      means forming first apertures located in said intermediate plate portion for insertion of clamping means which comprise a bolt-nut assembly,
      a lateral end plate portion having portions secured to said first and second side plate portions and said intermediate plate portion, and
      said basic joint member having an H-shaped lateral cross-section defining a space in which an end portion of at least one first longitudinal construction member made of timber is adapted to fit;
   said first application joint member comprises a first coupling plate portion having means forming second apertures for insertion of clamping means which comprise a bolt-nut assembly,
   said first coupling plate portion having one end fixed to a substantially central portion of the outer face of one of said first or second side plate portions and extending substantially parallel to said intermediate plate portion and capable of coupling a first lateral construction member made of timber.

31. The joint apparatus as set forth in claim 30, further comprising a bolt-nut assembly.

32. The joint apparatus as set forth in claim 30, wherein means forming third apertures are located in said lateral end plate portion.

33. The joint apparatus as set forth in claim 30, wherein said lateral end plate portion is secured to lower end portions of said first side plate portion, said second side plate portion, and said intermediate plate portion, to thereby be capable of supporting a lower end portion of the first longitudinal construction member above said lateral end plate portion.

34. The joint apparatus as set forth in claim 30, wherein said lateral end plate portion is secured at substantially intermediate-height positions on said first side plate portion, said second side plate portion and said intermediate plate portion, to thereby be capable of supporting a lower end portion of the first longitudinal construction member above said lateral end plate portion, and said lateral end plate portion is adapted to be placed on an upper end of another longitudinal construction member.

35. The joint apparatus as set forth in claim 30, wherein said first application joint member further comprises a first receiving plate portion secured to lower end portions of at least one side plate portion of the basic joint member and said first coupling plate portion and extending in a lateral direction, to thereby be capable of supporting a lower face of one end portion of the first lateral construction member.

36. The joint apparatus as set forth in claim 30, which further comprises a second application joint member comprising a second coupling plate portion for fixation and attachment of an oblique construction member, said second coupling plate portion extending from a substantially central portion of said lateral end plate portion in a direction substantially perpendicular to said lateral end plate portion.

37. The joint apparatus as set forth in claim 36, wherein said lateral end plate portion is secured to upper end portions of said first side plate portion, said second side plate portion and said intermediate plate portion.

38. The apparatus as set forth in claim 37, wherein said second application joint member further comprises a third receiving plate portion extending upwardly from one of said first and second side plate portions, and substantially perpendicular to said second coupling plate portion, and capable of impinging an end portion of the oblique construction member.

* * * * *

UNITED STATES PATENT AND TRADEMARK OFFICE
CERTIFICATE OF CORRECTION

PATENT NO. : 5,022,209
DATED : June 11, 1991
INVENTOR(S) : Kazuyoshi KIMURA

It is certified that error appears in the above-indentified patent and that said Letters Patent is hereby corrected as shown below:

```
     On the title page, item  [54], the title, line 1,
after "OF" insert ---BUILDINGS,---.
     At column 1, line 2, after "OF" insert ---BUILDINGS.---.
     At column 1, line 14, delete "a" (second occurrence).
     At column 1, line 17, after "field," insert ---a---.
     At column 10, line 34, change "19b" to ---19a---.
     At column 10, line 35, change "19b" to ---19a---.
```

Signed and Sealed this

Fifteenth Day of October, 1996

Attest:

BRUCE LEHMAN

*Attesting Officer*      *Commissioner of Patents and Trademarks*